(12) United States Patent
Radtke et al.

(10) Patent No.: US 6,970,772 B2
(45) Date of Patent: Nov. 29, 2005

(54) METHOD AND SYSTEM FOR EXCHANGING DATA IN A VEHICLE TRAIN VIA A PLC DATA BUS

(75) Inventors: Matthias Radtke, Hannover (DE); Ulrich Weihe, Garbsen (DE)

(73) Assignee: WABCO GmbH & Co. oHG, Hannover (DE)

( * ) Notice: Subject to any disclaimer, the term of this patent is extended or adjusted under 35 U.S.C. 154(b) by 8 days.

(21) Appl. No.: 10/405,133

(22) Filed: Apr. 2, 2003

(65) Prior Publication Data
US 2003/0195668 A1 Oct. 16, 2003

(30) Foreign Application Priority Data
Apr. 15, 2002 (DE) .................. 102 16 564

(51) Int. Cl.⁷ .......................... G05B 23/02
(52) U.S. Cl. .............. 701/1; 701/24; 701/33; 701/36; 303/122.06; 303/123; 303/124; 340/431
(58) Field of Search ............... 701/1, 24, 33, 701/36, 19; 303/121, 122.06, 123, 124; 340/431

(56) References Cited

U.S. PATENT DOCUMENTS

| 4,416,590 A | * | 11/1983 | Colucci ............... 417/231 |
| 6,127,939 A | | 10/2000 | Lesesky et al. |
| 6,254,201 B1 | | 7/2001 | Lesesky et al. |
| 6,373,375 B1 | * | 4/2002 | Hoetzel et al. ..... 340/310.01 |
| 6,378,959 B2 | | 4/2002 | Lesesky et al. |
| 6,512,307 B1 | * | 1/2003 | Ilg .................... 307/9.1 |

FOREIGN PATENT DOCUMENTS

| DE | 42 40 447 C1 | 9/1993 |
| DE | 197 03 144 C2 | 7/1998 |
| DE | 197 52 147 A1 | 5/1999 |
| DE | 199 13 919 C1 | 10/2000 |
| DE | 199 24 122 A1 | 11/2000 |
| EP | 0 659 613 A1 | 6/1995 |
| WO | WO 92/21180 A1 | 11/1992 |
| WO | WO 97/17232 A1 | 5/1997 |
| WO | WO 01/72555 A1 | 10/2001 |

OTHER PUBLICATIONS

Schiffer, Andrea; Thesis; Design and Evaluation of a Powerline Communication System in an Automotive Vehicle; Nov. 7, 2001 abstract.

(Continued)

*Primary Examiner*—Olga Hernandez
(74) *Attorney, Agent, or Firm*—Kramer Levin Naftalis & Frankel LLP

(57) ABSTRACT

A method for exchanging data in a vehicle train having a tractor, at least one trailer coupled to the tractor, and vehicle electronics allocated to the tractor and trailer interconnected via a PLC data bus used to provide programmed input and output functions for the vehicle electronics of the trailer. Data representing the programmed functionality is provided automatically and cyclically via the PLC data bus to the vehicle electronics. The vehicle electronics can be configured as ABS control electronics, the programmed input and output functions providing functionality beyond that of the ABS function. Control of these additional functions in the trailer vehicle electronics equipped with the specific functionality is then exercised via an input/output unit provided in the tractor and connected to the PLC data bus either directly or indirectly via the tractor ABS control electronics.

46 Claims, 16 Drawing Sheets

OTHER PUBLICATIONS

WABCO-Document No. 820 001 129, Mar. 5, 2000, ELM-Electronic Air Suspension Module for Trailers with Air Suspension.

MERITOR WABCO—SAE J1587-J2497 Message Transfer Marker, Apr. 15, 2002.

Schiffer, Andrea; Thesis; Design and Evaluation of a Powerline Communication System in an Automotive Vehicle; Nov. 7, 2001, translated pp. 4-6, 15, 32, 93 and 96.

* cited by examiner

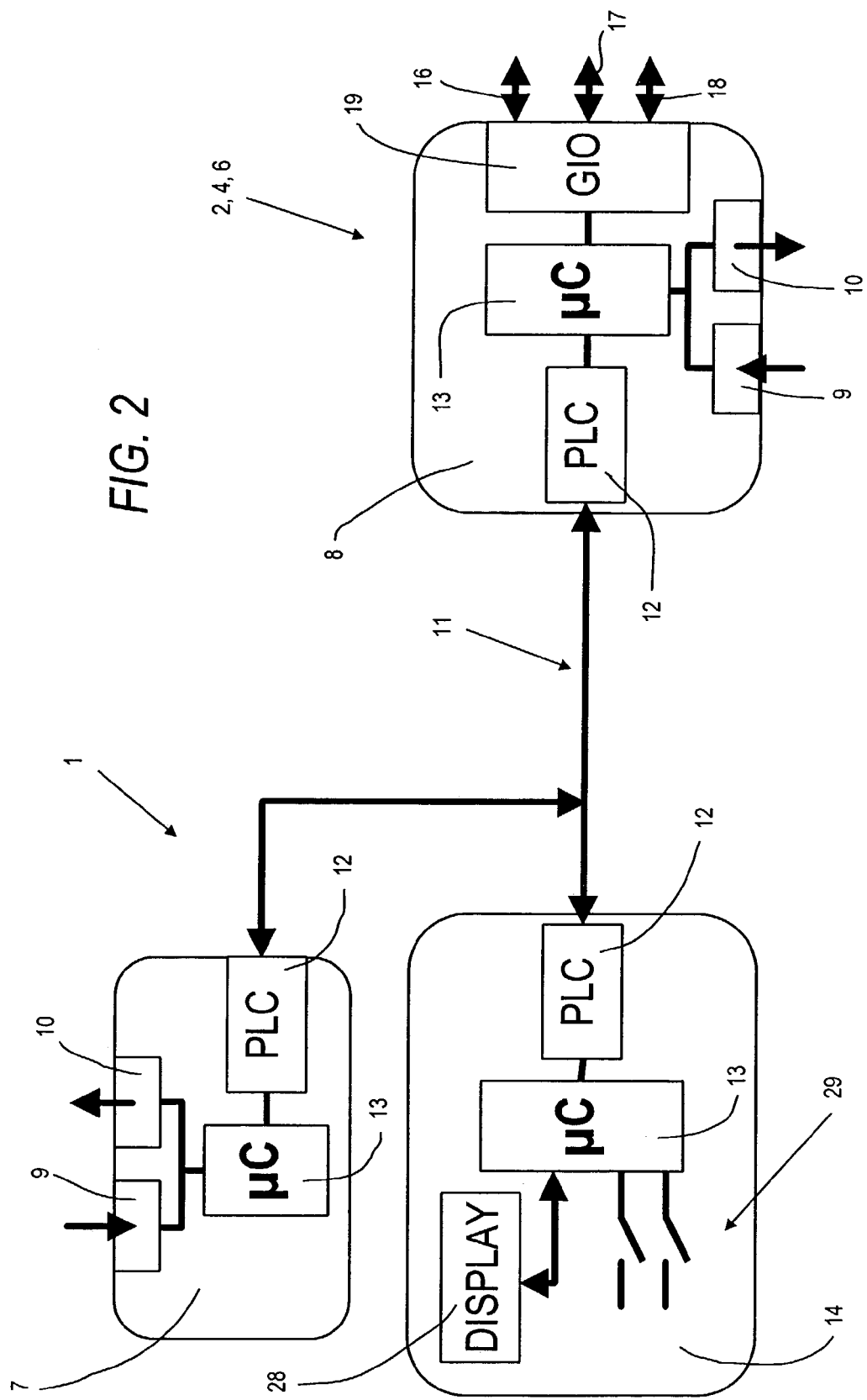

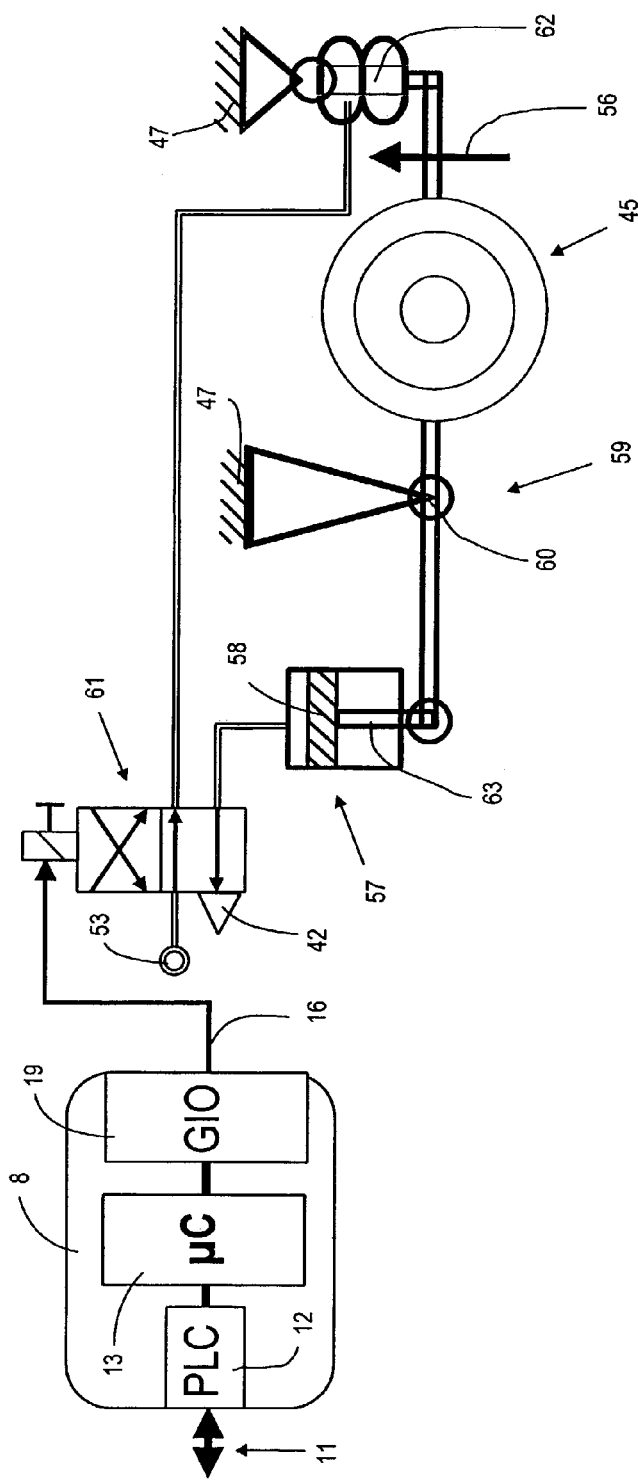
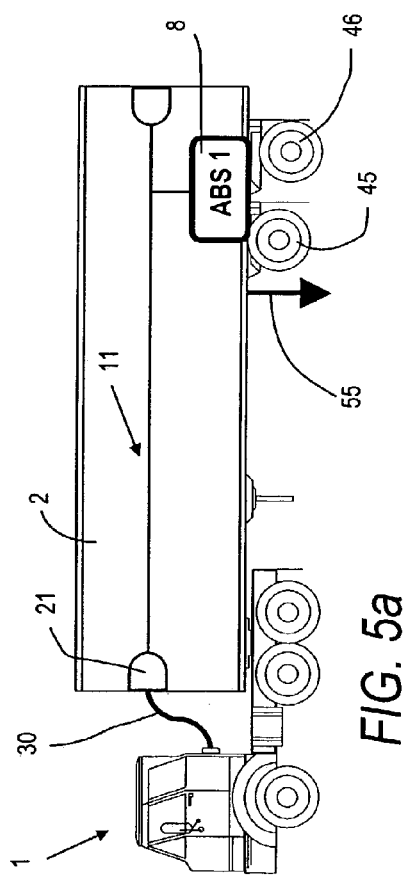
FIG. 5b
FIG. 5a

DIRECT COMMUNICATION VIA PLC

MESSAGE CONTAINING INFORMATION ON FUNCTIONALITY OF THE PNEUMATIC SUSPENSION:

| MESSAGE | MEANING | MID | PID_GIO_REP | n | FIDa | VALa | [FIDb | VALbj | | |
|---|---|---|---|---|---|---|---|---|---|---|
| 1.1 | FUNCTIONALITY INFORMATION | 137 | 204 | 2 | 41 | xxxx 1xxxb | | CS | | |
| | | | | | PNEUMATIC SUSPENSION | BIT 3 = 1: RAISE/LOWER AVAILABLE | | | | |

MESSAGES ABOUT CONTROL OF PNEUMATIC SUSPENSION:

| MESSAGE | MEANING | MID | PID_GIO_REQ | n | GIO_DEST | FIDa | VALa | [FIDb | VALbj | | |
|---|---|---|---|---|---|---|---|---|---|---|---|
| 1.2 | RAISE | 171 | 203 | 3 | 137 | 41 | xxxx 1xx1b | | | CS | |
| | | | | | | PNEUMATIC SUSPENSION | BIT 0 = 1: RAISE BODY BIT 3 = 1: RAISE/LOWER ACTIVE | | | | |
| 1.3 | LOWER | 171 | 203 | 3 | 137 | 41 | xxxx 1xx0b | | | CS | |
| | | | | | | PNEUMATIC SUSPENSION | BIT 0 = 0: LOWER BODY BIT 3 = 1: RAISE/LOWER ACTIVE | | | | |
| 1.4 | STOP | 171 | 203 | 3 | 137 | 41 | xxxx 0xxxb | | | CS | |
| | | | | | | PNEUMATIC SUSPENSION | BIT 3 = 0: RAISE/LOWER NOT ACTIVE | | | | |

FIG. 14

DIRECT COMMUNICATION VIA PLC

MESSAGE CONTAINING INFORMATION ABOUT THE FUNCTIONALITIES OF PNEUMATIC SUSPENSION AND AXLE-LOAD DETERMINATION

| MESSAGE | MEANING | MID | PID_GIO_REP | n | FIDa | VALa | FIDb | VALb | CS |
|---|---|---|---|---|---|---|---|---|---|
| 2.1 | FUNCTIONALITY INFORMATION | 137 | 204 | 4 | 41 | xxxx 1xxxb | 54 | 160 | CS |
| | | | | | PNEUMATIC SUSPENSION | BIT 3 = 1: RAISE/LOWER AVAILABLE | INDIVIDUAL AXLE LOAD | 160: INDIVIDUAL AXLE LOAD 16,000 PDS (0-250: DATA AVAILABLE, 255: DATA NOT AVAILABLE) | |

FIG. 15

INDIRECT COMMUNICATION VIA GATEWAYS

MESSAGE CONTAINING INFORMATION ABOUT THE FUNCTIONALITY OF THE PNEUMATIC SUSPENSION:

| MESSAGE | MEANING | MID$_{org}$ | PID$_{GM}$ | MID$_{GW\_DST}$ | PID_GIO_REP | n | FIDa | VALa | |
|---|---|---|---|---|---|---|---|---|---|
| 3.1 | FUNCTIONALITY INFORMATION | 151 | 205 | 136 | 204 | 2 | 41 | xxxx 1xxxb | CS |
| | | | GATEWAY MARKER PID | | | | PNEUMATIC SUSPENSION | BIT 3 = 1: RAISE/LOWER AVAILABLE | |

MESSAGES ABOUT CONTROL OF PNEUMATIC SUSPENSION:

| MESSAGE | MEANING | MID$_{org}$ | PID$_{GM}$ | MID$_{GW\_DST}$ | PID_GIO_REQ | n | GIO_DEST | FIDa | VALa | |
|---|---|---|---|---|---|---|---|---|---|---|
| 3.2 | RAISE | 171 | 205 | 137 | 203 | 3 | 151 | 41 | xxxx 1xx1b | CS |
| | | | GATEWAY MARKER PID | | | | | PNEUMATIC SUSPENSION | BIT 0 = 1: RAISE BODY BIT 3 = 1: RAISE/LOWER ACTIVE | |
| 3.3 | LOWER | 171 | 205 | 137 | 203 | 3 | 151 | 41 | xxxx 1xx0b | CS |
| | | | GATEWAY MARKER PID | | | | | PNEUMATIC SUSPENSION | BIT 0 = 0: LOWER BODY BIT 3 = 1: RAISE/LOWER ACTIVE | |
| 3.4 | STOP | 171 | 205 | 137 | 203 | 3 | 151 | 41 | xxxx 0xxxb | CS |
| | | | GATEWAY MARKER PID | | | | | PNEUMATIC SUSPENSION | BIT 3 = 0: RAISE/LOWER NOT ACTIVE | |

*FIG. 16*

METHOD AND SYSTEM FOR EXCHANGING DATA IN A VEHICLE TRAIN VIA A PLC DATA BUS

BACKGROUND OF THE INVENTION

The present invention is directed generally to a method for exchanging data in a vehicle train comprising at least one tractor and at least one trailer, wherein the vehicle electronics allocated to the tractor and trailer vehicle train parts are interconnected via a powerline carrier "PLC" data bus which is used to provide programmable input and output functions for the vehicle electronics of at least one trailer vehicle train part.

DE 199 24 122 A1 [hereinafter, "the '122 reference"], which is incorporated herein in its entirety by reference, generally discloses a method for controlling the operating functions of a vehicle. Vehicle electronics provided with a programmed microcomputer having a memory can actuate and deactivate vehicle operating elements by means of programmable outputs in order to effect vehicle operating function e.g., controlling an indicator lamp, an acoustic signal transmitter or an electromagnetic relay device.

In addition, the microcomputer is linked, preferably via a Controller Area Network CAN bus, to other control and regulating devices in the vehicle, and input signals can be received via this data bus. In this way, for example, information definable by the vehicle operator can be transmitted via a diagnostic unit by means of programmable inputs to the microcomputer.

The input data are stored in the memory of the microcomputer and are then available for evaluation. In this way, input signal values from any desired signal source can be linked logically, and the results of the linking operation can be output to any desired receiving means, which can be of digital type or, if digital-to-analog converters are used, of analog type.

In the method described in the '122 reference for a trailer as part of a vehicle train, the programmable input and output functions provided in the trailer can be controlled by the vehicle electronics provided in the trailer itself, especially by the microcomputer contained in the vehicle electronics. However, control of programmable input and output functions in the trailer by means disposed outside the data connection installed in the trailer itself, namely, the CAN data bus of the vehicle, is not taught or suggested.

Accordingly, it is desired to provide an improved method for controlling the exchange of data between the tractor and trailer parts in a vehicle train to control various vehicle train operating functions.

SUMMARY OF THE INVENTION

Generally speaking, in accordance with the present invention, a method and associated system for controlling the exchange of data between the tractor and trailer parts in a vehicle train to control vehicle train operating functions utilizing the PLC data bus is provided.

According to the present invention, in a vehicle train including a tractor and at least one trailer vehicle train part coupled to the tractor, the individual tractor and trailer vehicle train parts are interconnected via a PLC data bus, desirably corresponding to SAE J 2497, a current United States standard. Preferably, data exchange takes place in accordance with SAE J 1587, another standardized protocol.

Vehicle electronics with programmable input and output functions are provided in the tractor and in at least one trailer part in the vehicle train in which electronic measuring or control functions are implemented. The vehicle electronics in the trailer part include programmed input and output functions associated with operating functions of the vehicle train. The vehicle electronics include a PLC interface. A PLC data bus is formed by the electrical interconnection of the PLC interfaces of the vehicle electronics to enable the transmission and reception of data between the vehicle electronics. The data-exchange method according to the present invention involves providing data representing a programmed input and/or output function of the vehicle electronics of the trailer vehicle train part automatically and cyclically to other vehicle electronics having PLC interfaces.

This enables the vehicle operator of the vehicle train to control the trailer parts from vehicle electronics provided in the tractor. As discussed in greater detail hereinafter, this cannot be accomplished using prior art methods, such as disclosed in the '122 reference.

Accordingly, it is an object of the present invention to provide an improved method for controlling the exchange of data between the tractor and trailer(s) in a vehicle train to control various vehicle operating functions.

It is a further object of the present invention to provide a data-exchange method for a vehicle train wherein control of programmable input and output functions within vehicle electronics of trailer train parts is possible by the vehicle electronics interconnected by a PLC data bus.

It is another object of the present invention to provide a data exchange method for a vehicle train utilizing vehicle electronics configured as ABS control electronics interconnected by a PLC data bus to provide functionality beyond that of the ABS function.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1b is a block diagram showing vehicle electronics of the semitrailer vehicle train depicted in FIG. 1a;

FIG. 2 is a schematic diagram showing ABS control electronics provided in a trailer part of a vehicle train, wherein there are implemented additional programmable input and output functions which, via the PLC bus, are controlled directly by a display/control unit provided in the tractor, according to the method and system of the present invention;

FIG. 5a is a side elevational view of a tractor and trailer combination arranged and constructed in accordance with the present invention.

FIG. 5b is a schematic diagram illustrating use of additional programmable input and output functions for implementation of lift-axle control in the trailer part of the vehicle depicted in FIG. 5a, according to the method of the present invention;

FIG. 14 shows sample messages in the form of direct communication via the PLC data bus corresponding to the arrangement depicted in FIG. 2, relative to the practical functionality illustrated in the arrangement depicted in FIG. 4, according to the method and system of the present invention;

FIG. 15 shows a message according to FIG. 14, representing the implementation of two different functionalities, according to the method and system of the present invention; and FIG. 16 shows the sample messages according to FIG. 14 in the form of indirect communication via gateways, corresponding to the arrangement depicted in FIG. 3, according to the method and system of the present invention.

DETAILED DESCRIPTION OF THE PREFERRED EMBODIMENTS

Figure 1A:
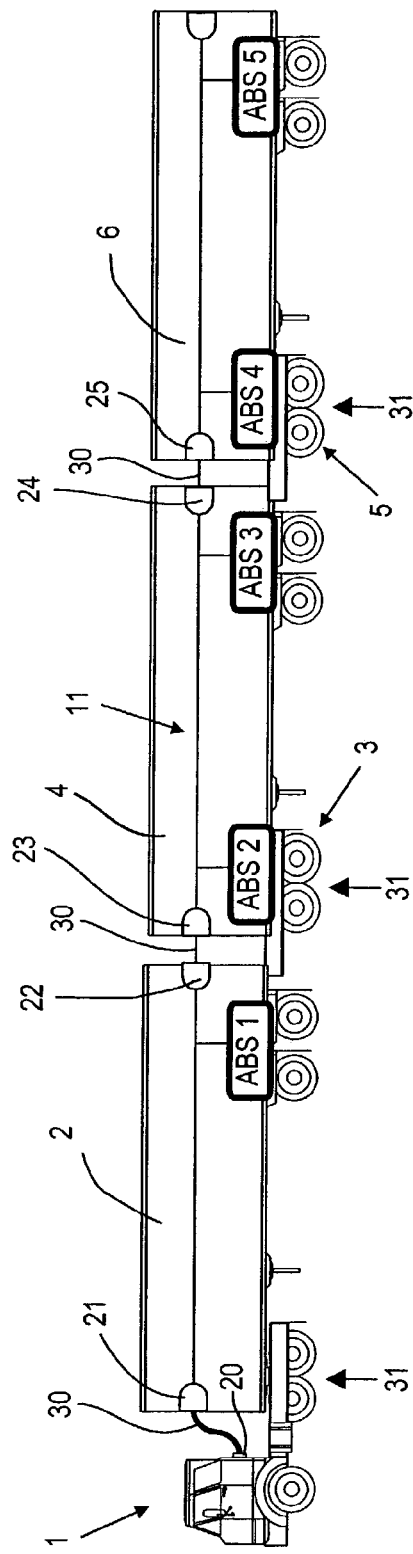
FIG. 1a is a side elevational view of a semitrailer vehicle train arranged and constructed in accordance with the present invention.

Referring now to the drawing figures where like reference numbers are used for corresponding elements, FIG. 1a shows a vehicle train including a tractor and one or more trailer parts. If only one trailer is provided, it is coupled to the tractor; if two trailers are provided, the first trailer is coupled to the tractor and the second trailer is coupled to the first trailer. In this way a further trailer part can be coupled at any time to the vehicle train. Pursuant to current legal regulations applicable in the United States, a vehicle train of one tractor and at most five further trailer parts can be formed in this way.

The trailer can be a drawbar trailer or a semitrailer. In the latter case, a trailer part designed as a dolly axle is provided for coupling one semitrailer part to another.

FIG. 1a shows a semitrailer vehicle train of maximum size allowed under current United States regulations. The semitrailer is assembled from one tractor 1 and five trailer parts 2, 3, 4, 5, 6. The first trailer part 2 is designed as a semitrailer; the second trailer part 3 as a dolly axle; the third trailer part 4 as a semitrailer; the fourth trailer part 5 as a dolly axle; and the fifth trailer part 6 as a semitrailer. The pivotal connections between semitrailer 2 and tractor 1 and semitrailers 2, 4, 6 and dolly axles 3, 5 are made by kingpins 31.

In each vehicle train part in which electronic measuring or control functions are implemented, including at least tractor 1 and at least one further trailer part, there is provided at least one vehicle electronics (e.g., electronic control unit) equipped with a PLC interface. Preferably, such interface is configured in accordance with Society of Automotive Engineers ("SAE") Standard J 2497 titled "Power Line Carrier Communications for Commercial Vehicles," which has been adopted as the current industry standard for heavy commercial vehicles in the United States [this document and standard is hereinafter referred to as "SAE J 2497" and is incorporated herein in its entirety by reference].

Figure 1B:
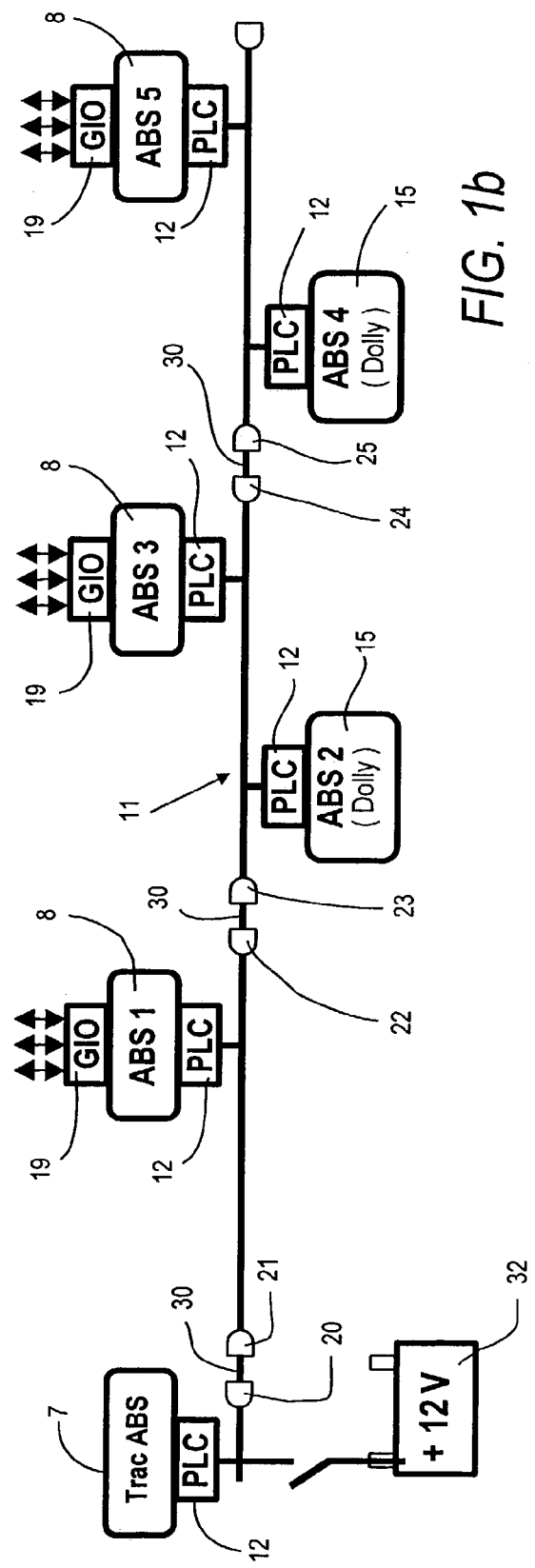

In addition to their mechanical coupling, the vehicle electronics with PLC interface are also electrically interconnected. Thus, as shown in FIG. 1b, PLC interfaces 12, as part of the individual vehicle electronics, are connected via cable to plug connectors 20, 21, 22, 23, 24 and 25, and these plug connectors are interconnected by connecting cables 30 to form a continuous PLC data bus 11.

Desirably, connecting cables 30 are designed to fit plug connectors 20, 21, 22, 23, 25, which conform to SAE Standard J 560 titled "Seven Conductor Electrical Connector for Tractor-Trailer Jumper Cable" [hereinafter, "SAE J 560"].

In the tractor, PLC data bus 11, especially the power-supply line of the data bus, is connected, preferably via switching means installed in the ignition lock, to the power-supply of the vehicle train, namely, vehicle battery 32.

Via PLC data bus 11, each of the installed vehicle electronics with PLC interface 12 can receive information from other vehicle electronics having a PLC interface 12, or they can transmit information, by making information available on PLC data bus 11, to the other vehicle electronics having a PLC interface 12. This data exchange preferably takes place according to the protocol titled "Joint SAE/TMC Electronic Data Interchange Between Microcomputer Systems in Heavy-Duty Vehicle Applications," corresponding to SAE J 1587, the current standard in the United States [this document and standard is hereinafter referred to as "SAE J 1587," and is incorporated herein in its entirety by reference].

In the data-exchange method according to the present invention, the vehicle electronics with PLC interface 12 installed in a vehicle train part can be configured as desired, since the data exchange takes place via the PLC interface 12, and it is not critical which function the vehicle electronics performs in this vehicle train part.

In the United States, however, anti-brake-lock regulation is currently required for heavy vehicle parts ["Class 8" vehicle parts, or, in other words, tractor or semitrailers], for which reason ABS control electronics are provided and, as discussed, these vehicle parts are also equipped with a PLC interface 12 to satisfy the current legal regulations. Since ABS control electronics are provided in these vehicle parts in any case, it is advantageous to utilize them in the method and system according to the present invention.

The ABS control electronics are provided as tractor ABS control electronics 7 [Trac ABS in FIGS. 1a and b] in tractor 1; as trailer ABS control electronics 8 [ABS 1, 3, 5 in FIGS. 1a and b; ABS in FIG. 5a] in trailer parts 2, 4, 6 provided as semitrailers; and as trailer ABS control electronics 15 [ABS 2 and 4 in FIGS. 1a and b] in trailer parts 3, 5 provided as dolly axles.

In ABS control electronics 7, 8, 15, there are defined closed-loop control channels to which the vehicle wheels are allocated either as an individual wheel or as an axle. For a closed-loop control channel, the speeds of rotation of the wheels allocated to the control channel are used as input signals, while output signals represent switching signals transmitted to ABS solenoid valves of the control channel for the purpose of reducing or maintaining pressure. The ABS control electronics determine wheel-slip values in known manner from wheel-signal inputs and, via ABS solenoid valve outputs, ensure brake-pressure reduction if necessary in order to prevent brake lock.

For at least one of ABS control electronics 8, there are shown in FIG. 1b further input and output functions 19 ("generic input/output functions" or "GIOs"), which are discussed in greater detail hereinafter. The type of trailer ABS control electronics 8 can also be used for the trailer vehicle parts designed as drawbar trailers.

The trailer ABS control electronics 15 for the trailer vehicle parts of the "dolly axle" type are not typically equipped with further input and output functions. While such functions can be used in trailer ABS control electronics 15 as well, it is generally not necessary in view of the reduced function of a dolly axle as a support element.

Figure 3:
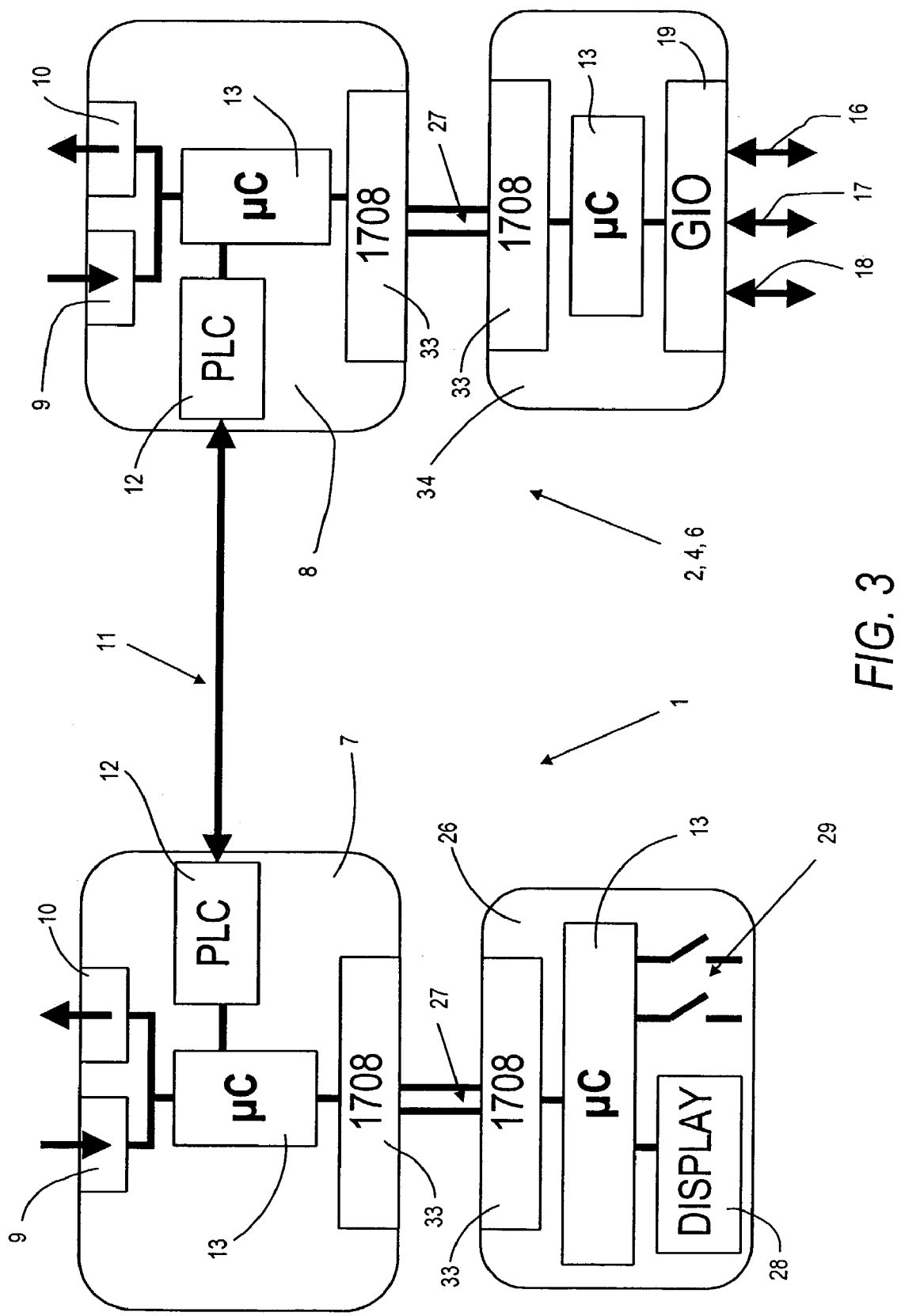
FIG. 3 is a schematic diagram showing the implementation of additional programmable input and output functions in a trailer part as further vehicle electronics, and also illustrating indirect control thereof, via the PLC data bus, by the tractor and trailer ABS control electronics connected to the data bus, according to the method and system of the present invention.

Referring now to FIGS. 2 and 3, for ABS control electronics 8, the wheel-signal inputs are denoted by reference number 9, and the ABS solenoid valve outputs are denoted by reference number 10.

FIG. 2 shows tractor ABS control electronics 7 disposed in tractor 1 together with PLC interface 12, which is connected to a microcomputer 13, and which imposes anti-brake-lock regulation by means of ABS inputs/outputs 9, 10.

Tractor 1 is preferably provided with a display/control unit 14 which is equipped with a PLC interface 12, a microcomputer 13, a display module 28 configured as, for example, an LCD display, and a control module 29 designed, for example, in the form of toggle switches, the two modules 28, 29 also being connected to microcomputer 13.

FIG. 2 further shows ABS control electronics 8 provided in trailer parts 2, 4, 6 designed as a semitrailer together with PLC interface 12 and microcomputer 13, which imposes anti-brake-lock regulation using ABS inputs/outputs 9, 10.

The PLC interfaces of modules 7, 14, 8 are connected to PLC data bus 11 in the manner described above.

In addition to ABS inputs/outputs 9, 10, there are provided in trailer ABS control electronics 8 further input and output functions 19 for implementation of practical functionality beyond anti-brake-lock regulation. In FIG. 2, these are the inputs/outputs 16, 17, 18. The properties of inputs/outputs 16, 17, 18 are defined by parameterization, as indicated in greater detail hereinafter. In this way, additional functions 19 are configured as programmable input and output functions. In at least one of the trailer ABS control electronics 8 implemented in trailer parts 2, 4, 6, there is provided at least one programmable input function and/or at least one programmable output function, the number of functions implemented being dictated by the type and scope of the practical functionality implemented with further input and output functions 19.

By means of the PLC data protocol according to SAE J 1587, the programmed practical functionality implemented by using further programmed input/output functions 19 is made available by trailer ABS control electronics 8 to the other vehicle electronics having PLC interfaces by the fact that this information is fed automatically and cyclically onto PLC data bus 11 [broadcast function]. Automatically and cyclically means that trailer ABS control electronics 8 independently feeds this information onto the data bus and does so in a repetitive cycle at fixed intervals, such as, for example, 5-second intervals.

Information appearing automatically and cyclically on PLC data bus 11 is used by other vehicle electronics to recognize the programmed practical functionality in trailer ABS control electronics 8 with further input/output functions 19, thus ensuring that the other vehicle electronics have the ability to command the program-controlled functions.

In this way, vehicle electronics installed in the tractor recognize, by evaluation of the information made available automatically and cyclically on PLC data bus 11 by trailer ABS control electronics 8, the further practical functionality implemented by further programmable input/output functions 19, and proceed to control the programmable input and output functions. This control and data evaluation of application functions is performed in the tractor by display/control unit 14, which communicates with PLC data bus 11 via its PLC interface 12. Control of the functions is achieved by the vehicle operator via control module 29 in display/control unit 14, while information intended for the vehicle operator is shown on display module 28 of display/control unit 14 on the basis of the further practical functionality implemented in trailer ABS control electronics 8.

As shown in FIG. 2, communication between trailer ABS control electronics 8 with its programmably expanded practical functionality, which is to be controlled, and display/control unit 14, which undertakes control of this practical functionality, takes place by direct communication of these two units and PLC data bus 11 via PLC interfaces 12.

As an alternative, it is shown in FIG. 3 that transfer of the identification of the programmed further practical functionality can also take place indirectly via the PLC bus, as can application control.

Referring to FIG. 3, there is provided a display/control unit 26, which is the same as display/control unit 14 as regards its control and display modules, but is not equipped with its own PLC interface 12, and which is connected to tractor ABS control electronics 7 via further data-communication means.

Such further communication means can have different forms. In the arrangement depicted in FIG. 3, the data-communication means are implemented via two-wire line 27, by which serial communication takes place in conformity with SAE Standard J 1708 titled "Serial Data Communications between Microcomputer Systems in Heavy-Duty Vehicle Applications [referred to hereinafter as "SAE J 1708"]. For such communication, display/control unit 26 is equipped with a type SAE J 1708 serial interface 33. Tractor ABS control electronics 7 is also equipped with interface 33.

FIG. 3 shows a network comprising PLC data bus 11, ABS control electronics 7, 8 connected to the PLC bus, and display/control units 26, 34, which are connected via the SAE J 1708 interface 33 by means of two-wire lines 27.

Via interface 33, a crossover operation, namely, the gateway function, is implemented in ABS electronics 7, 8 on PLC data bus 11. With the gateway, not only can data from PLC data bus 11 be transmitted to a display/control unit 26, 34 connected to interface 33, but also data from units 26, 34 can be transferred via the gateway onto PLC data bus 11.

This gateway function is described in "SAE J 1587-J 2497 Gateway Marker," a standard proposed by Meritor WABCO and submitted to the SAE standardization committee. The further explanation of this method will be based on the contents of that document, which document is hereinafter referred to as "SAE J 1587-J 2497" and is incorporated herein in its entirety by reference. It should be understood that SAE J 1587-J 2497 relates to the data exchange protocol SAE J 1587 and the PLC data bus standard of SAE J 2497. Reference is also made in proposed standard SAE J 1587-J 2497 to parts of SAE J 1708.

Indirect communication between tractor ABS control electronics 7 and display/control unit 26 takes place by the fact that microcomputer 13 of the tractor ABS control unit evaluates the message originating from trailer ABS control electronics 8 in such a way that the information regarding the additional practical functionality made available cyclically and automatically on PLC data bus 11 is extracted and transmitted via two-wire line 27 to display/control unit 26. The control information generated by display/control unit 26 is transmitted via two-wire line 27 to tractor ABS control electronics 7 and from there is transmitted on PLC data bus 11 in conformity with the PLC data protocol of SAE J 1587.

On the side of trailer ABS control electronics 8, communication also takes place indirectly by the fact that trailer ABS control electronics 8 is connected via further data communication means to a further trailer vehicle electronics 34, in which the further programmable practical functionality are installed. Serial data transfer according to SAE J 1708 is also the preferred data communication means. Trailer ABS control electronics 8 is therefore additionally equipped with serial interface 33, to which there is connected two-wire line 27 to further trailer vehicle electronics 34.

Further trailer vehicle electronics 34 contains further input/output functions 19, as are implemented in trailer ABS control electronics 8 as depicted in FIG. 2. Vehicle electronics 34 assures the functional principle discussed above in connection with trailer ABS control electronics 8 and FIG. 2, in that the practical functionality is made available automatically and cyclically. In this case, however, this information is made available via two-wire line 27 to trailer ABS control electronics 8 as depicted in FIG. 3. This information is then converted in the manner described above to conform to the PLC data protocol according to SAE J 1587, and is fed onto PLC data bus 11. The control information for further trailer vehicle electronics 34 is also transmitted via the PLC data bus to trailer ABS control electronics 8, where it is serially converted and transferred via two-wire line 27 to further trailer vehicle electronics 34.

Besides the direct communication illustrated in FIG. 2 and the indirect communication illustrated in FIG. 3, hybrid forms of the two functional principles are also possible. For example, tractor ABS control electronics 7 and display/control unit 14 shown in FIG. 2 can be replaced by the combination of tractor ABS control electronics 7 and display/control unit 26 shown in FIG. 3. Conversely, the combination of trailer ABS control electronics 8 and further trailer vehicle electronics 34 shown in FIG. 3 can be replaced by trailer ABS control electronics 8 shown in FIG. 2.

The advantage of indirect communication is that costs are saved. PLC interfaces in which the information to be transmitted is modulated on the power supply line, and via which, as discussed herein, the PLC data protocol according to SAE J 1587 is also to be implemented, have relatively complex structure because of these requirements With indirect communication entailing relatively less complex serial two-wire lines, the manufacturing costs can be reduced on the whole.

For the following descriptions of arrangements depicted in FIGS. 4–13, it is assumed that trailer ABS control electronics 8 with additional programmable input and output functions 19 and display/control unit 14 are configured as shown in FIG. 2.

Figure 4:
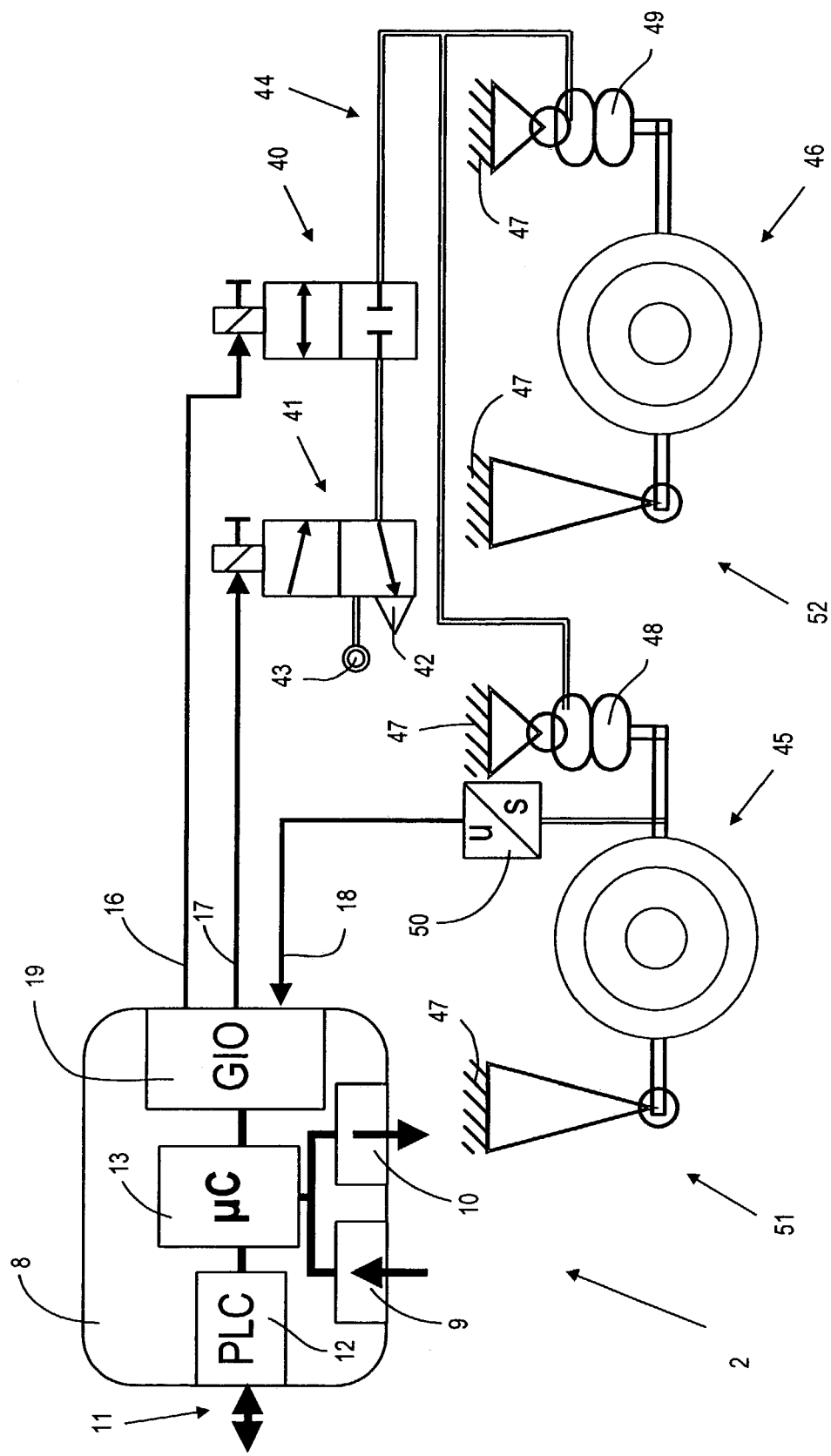
FIG. 4 is a schematic diagram illustrating use of additional programmable input and output functions in the trailer part for implementation of control for a level-regulated pneumatic suspension, according to the method and system of the present invention.

In a semitrailer part, the wheels, which are usually provided as at least four wheels and so usually form at least one double axle, are braced via suspension elements against the vehicle body. Referring to FIG. 4, first wheel 45 and second wheel 46 on one side of the vehicle train are shown for such a double axle.

Wheels 45, 46 are pivotally connected to vehicle body 47 via articulated connecting means 51, 52 and are braced relative to vehicle body 47 via pneumatic suspension bellows 48, 49. The pressure in pneumatic suspension bellows 48, 49 determines the level height, or, in other words, the distance of the double axle relative to vehicle body 47. A level-height sensor 50 is provided for determination of level height.

Pneumatic suspension bellows 48, 49 for wheels 45, 46 of the shown vehicle side and the other two pneumatic suspension bellows, not illustrated, for the wheels of the other vehicle side, are in communication via pneumatic lines 44 with solenoid valves 40, 41, which are provided for adjustment and variation of the level height by changing the pressure in the pneumatic suspension bellows.

By virtue of the inherent rolling stability of the semitrailer part in a double axle, all four pneumatic suspension bellows can be pressurized and exhausted together by solenoid valves 40, 41, and, moreover, only single level-height sensor 50 is necessary for determining the level height of the double-axle wheels relative to the vehicle body.

Solenoid valve 40 functions as a shutoff valve. The home position with de-energized solenoids is the shutoff position, in which pressure is tightly sealed in pneumatic suspension bellows 48, 49. To change the pressures in pneumatic suspension bellows 48, 49, shutoff solenoid valve 40 is actuated and is then in pneumatic communication with direction-selecting solenoid valve 41. In the unactuated state, pneumatic suspension bellows 48, 49 are exhausted via valve exhaust 42, and in the actuated state, pressurization takes place via air reservoir 43.

The additional functionality implemented in trailer ABS control electronics 8 by using further functions 19 includes control of solenoid valves 40, 41, sensing of level-height sensor 50 and execution of level-regulating functions. By parameterization, inputs/outputs 16, 17 are defined as outputs having voltage levels suitable for solenoid valves 40, 41, while input/output 18 is configured as an input with the input voltage range [measurement range] defined by level-height sensor 50.

Level regulation is executed in cooperation with display/control unit 14 in tractor 1, by which unit the functions of level-height regulation are controlled. In this way, the vehicle operator selects the desired level height via control module 29 and, at display module 28, recognizes the current actual level height.

Microcomputer 13 executes the additional level-regulation control functions in trailer ABS control electronics 8 in conformity with the commands from control module 29.

As the basis for the sample messages set forth in FIGS. 14, 15 and 16, described in greater detail hereinafter, trailer ABS control electronics 8 is installed together with the pneumatic-suspension level-regulation control in first trailer vehicle part 2. It can also be installed in trailer vehicle parts 4 or 6, in which case the messages depicted in FIGS. 14, 15 and 16 will change accordingly.

Level regulation of the pneumatic suspension can also be implemented, for example, by using as the electronic-pneumatic control unit an "ELM Electronic Air Suspension Module for Trailers with Air Suspension" of WABCO, as described in WABCO Document No. 820 001 129 3/05.2000 [which is hereinafter referred to as "WABCO 820 001 129" and is incorporated herein in its entirety by reference]. The ELM control unit represents further vehicle electronics, which can be installed in trailer vehicle parts 2, 4, 6. The ELM unit is powered by the power supply line of the PLC data bus, but otherwise is not coupled to PLC bus 11 in a way that permits data communications. If the vehicle operator is to change the level height in this arrangement, the operator must climb down from the cab and walk to the semitrailer vehicle part, attach an ELM remote-control unit [as it is called in WABCO 820 001 129] to a plug connector, which is connected to the ELM control unit of the semitrailer using a cable [called "Cable for Remote-Control Unit" in WABCO 820 001 129], and perform the actual control operation.

This example illustrates the difference between the operator's involvement in an additional electronic control unit for implementation of a particular control function on the one hand, and the integration of this control function in the method and system according to the present invention on the other hand. That is, according to the present invention, the vehicle operator is able to control all functions of the vehicle train from the cab, where all important conditions in the vehicle train are also displayed.

What has been described with reference to FIG. 4 with regard to input of parameters to module 28, transfer of practical data to the vehicle operator via module 28, mutual data transfer in both transmission directions between display/control module 14 on the one hand and trailer ABS control electronics 8 on the other hand, as well as the nature of implementation of additional control and regulation functions in microcomputer 13 of trailer ABS control electronics 8 itself, is equally valid for the applications, discussed in greater detail hereinafter with reference to FIGS. 5–13. The descriptions of these applications in this regard will therefore focus on the additional functionality implemented in the respective application.

For the practical example of lift-axle control shown in FIG. 5, the lift axle to be controlled is installed in first trailer vehicle part 2, although the same is also possible for the other vehicle parts 4 and 6. A lift axle has two conditions: it can assume either the extended condition [also known as "lowered" condition] or the retracted condition [also known as "raised" condition]. Retracted condition is used for light loads, in which the lift axle will not transmit any load to the roadway, thus ensuring a reduced rolling resistance of the vehicle. Extended condition is applied for heavy loads, in which the lift axle transmits the load portion for which it is designed to the roadway. Thus, the lift axle is retracted or extended depending on load, and the extended condition therefore corresponds to the function of a double axle as shown in FIG. 4.

In FIGS. 5*a* and 5*b*, the axle allocated to first wheel 45 on one side of the vehicle train is designed as the lift axle. In the diagram of the vehicle train in FIG. 5*a*, this axle is shown in the retracted condition. Arrow 55 indicates the direction of axle extension.

The mechanical device for adjustment of the lift axle [which is known to those skilled in the art] comprises a mechanical tilt mechanism 59 with a fulcrum 60, by which the lift axle, indicated by first wheel 45, can be retracted or extended. Tilt mechanism 59 is shown in FIG. 5*b* in the condition of the extended lift axle. Mechanical tilt mechanism 59 is controlled by two pneumatic modules comprising a lift-axle pneumatic-suspension bellows 62 on the one side, which when pressurized causes clockwise rotation of tilt mechanism 59 about fulcrum 60, or, in other words, movement in extension direction 55, and a lift-axle actuating cylinder 57 on the other side, which, during pressurization of its piston chamber, causes counterclockwise rotation of the tilt mechanism about fulcrum 60, or, in other words, movement in retraction direction 56 of the lift axle.

For the change of lift-axle condition, there is provided a lift-axle solenoid valve 61, which, in its unactuated condition, pressurizes lift-axle pneumatic-suspension bellows 62 via a specified set pressure 53, which is load-dependent, and simultaneously exhausts the piston chamber of lift-axle actuating cylinder 57. In the unactuated position of lift-axle solenoid valve 61, therefore, the lift axle is extended.

During actuation of lift-axle solenoid valve 61, or, in other words, upon energization of its control solenoid, lift-axle pneumatic-suspension bellows 62 is exhausted via valve exhaust 42, thus becoming pressureless, and the cylinder piston chamber of lift-axle actuating cylinder 57 is pressurized by the bellows set pressure 53. Piston 58 and therewith piston rod 63 of lift-axle actuation cylinder 57 is extended, and the tilt mechanism turns in retraction direction 56.

When lift-axle solenoid valve 61 is not actuated, the lift axle is therefore extended, corresponding to a heavy load; and when lift-axle solenoid valve 61 is actuated, the lift axle is retracted, corresponding to a light load. The additional functionality implemented for lift-axle control in trailer ABS control electronics 8 using further functions 19 therefore comprises control of lift-axle solenoid valve 61. For this purpose, input/output 16 is defined as an output with voltage levels suitable for solenoid valve 61.

Lift-axle actuating cylinder 57 can also be provided as a double part, in other words, as one actuating cylinder on each side of the vehicle train, as can lift-axle pneumatic-suspension bellows 62. For mechanical reversal, however, it is sufficient to have one lift-axle solenoid valve 61 which supplies all provided pneumatic modules with compressed air in the manner described above.

Figure 6:
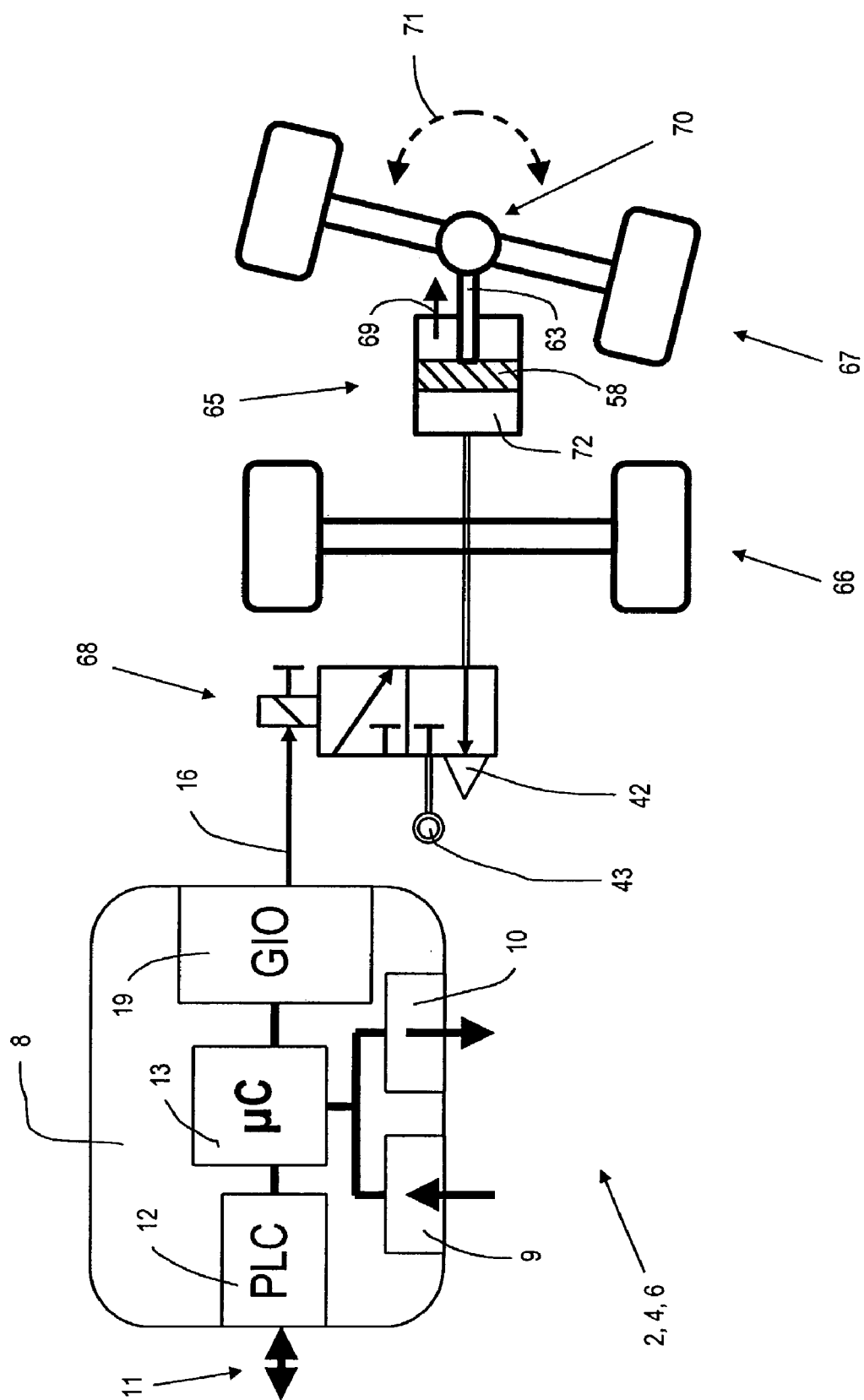
FIG. 6 is a schematic diagram illustrating use of additional programmable input and output functions in a trailer part for implementation of steering-axle control, according to the method and system of the present invention.

As shown in FIG. 6, one axle, usually the first vehicle axle in driving direction, is designed as fixed axle 66, while the second vehicle axle is designed as self-steering axle 67 for service as a steering axle in a trailer vehicle train part with a double-axle as depicted in FIG. 4. By means of a turning knuckle 70, the steering axle, indicated by slewing range 71, can be slewed axially about the turning-knuckle center. During driving on a curve, trailer vehicle parts 2, 4, 6 adapt automatically to the curve radius by virtue of the automatic slewing of steering axle 67, and so the vehicle train is able to negotiate tighter curves, without twisting the axles, better than is possible when a typical double axle construction is used.

During reversing or high-speed highway driving, however, the steering axle is locked by a locking device actuated by a locking cylinder 65 is employed in turning knuckle 70. Locking is achieved by pressurizing locking cylinder 65, whereby piston 58 and therewith piston rod 63 acts through force closure in locking direction 69 on the locking device of turning knuckle 70, and thus fixes steering axle 67 in a manner that ensures that no further slewing movements 71 will occur.

The functionality implemented for steering-axle control using further input/output functions 19 includes defining input/output 16 as an output with a voltage level suitable for locking solenoid valve 68. While output 16 is de-energized, locking solenoid valve 68 is located in its home position, and piston chamber 72 of locking cylinder 65 is kept pressureless by valve exhaust 42. In this condition, the steering axle can be slewed without restriction. Upon application of the valve operating voltage at output 16, locking solenoid valve 68 changes over to its operating condition, and piston chamber 72 is pressurized via air reservoir 43, thus occupying the locking position.

Figure 7:
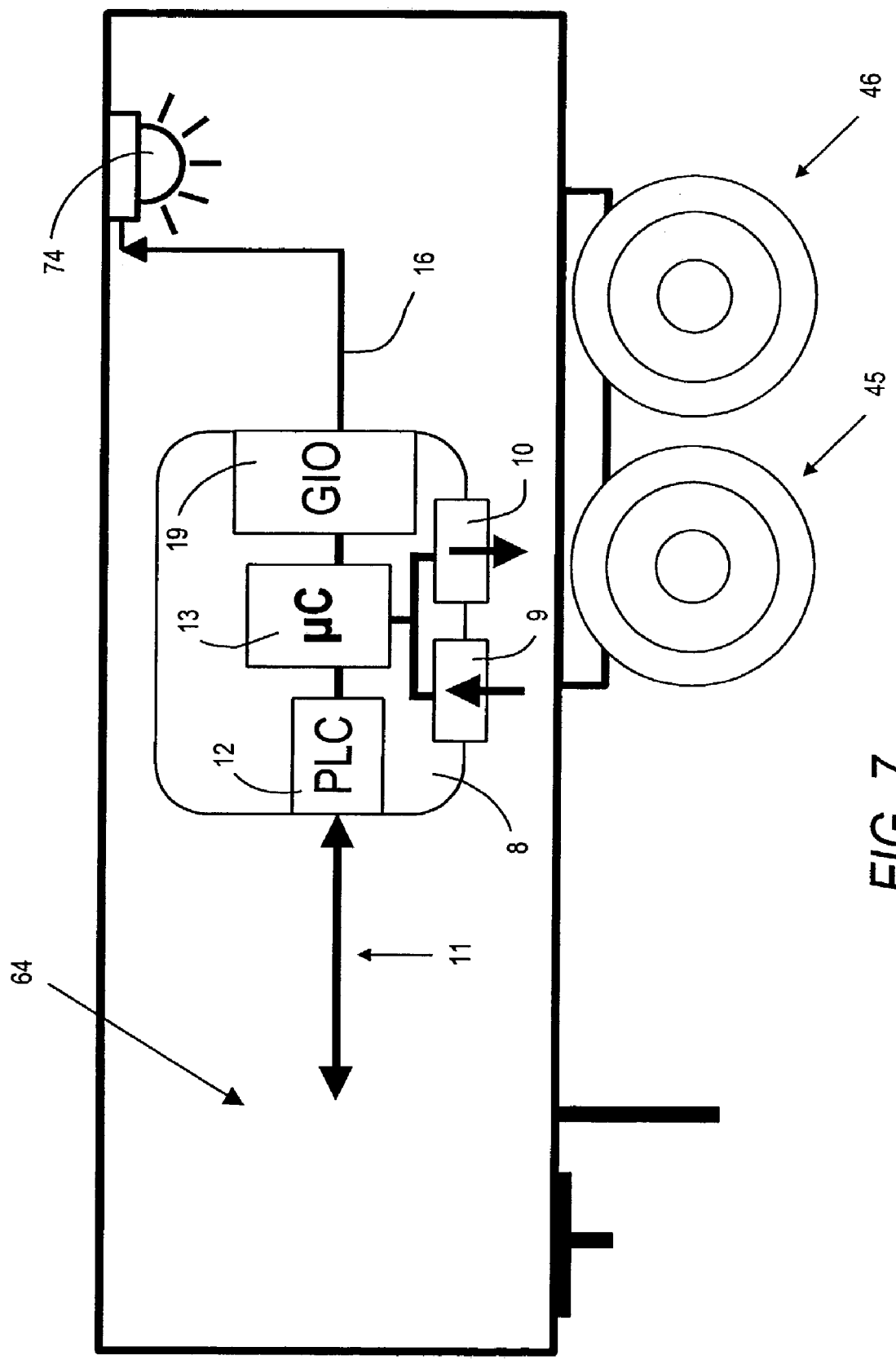
FIG. 7 is a side elevational schematic diagram of a semitrailer illustrating use of additional programmable input and output functions in the trailer part for control of interior lighting, according to the method and system of the present invention.

FIG. 7 illustrates how the functionality of lighting control for the cargo space of a trailer vehicle part designed as a semitrailer part is implemented using further input/output functions 19 according to the method of the present invention. Input/output 16 is defined as an output having sufficient electrical power for direct activation of a lamp 74 in cargo space 64 of trailer vehicle parts 2, 4, 6.

Cargo-space lighting is advantageous in particular during loading and unloading of the semitrailer. By means of the PLC data communication with the tractor vehicle part, lamp 74 can be selectively turned on and off. In this way, the vehicle operator can turn on the lighting using control module 29.

Alternatively, this can take place automatically, in which case the lighting is turned on when the vehicle train has stopped moving. This operation is then performed directly by trailer ABS control electronics 8. For this purpose, it is desirable for data pertaining to the driving condition ["stopped" or "drive"] to be directly available to microcomputer 13 via the ABS basic function.

Figure 8:
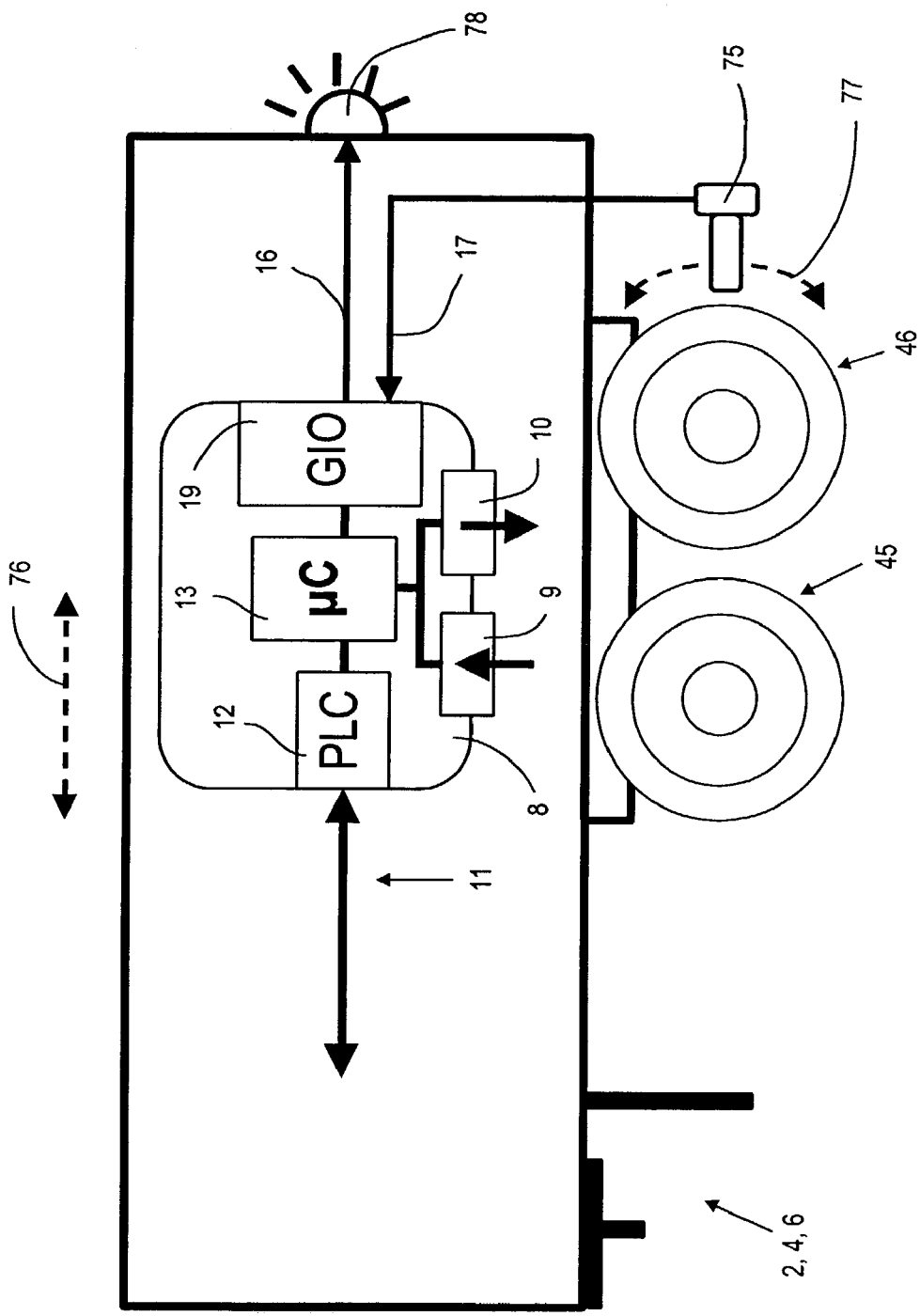
FIG. 8 is a side elevational schematic diagram of a semitrailer illustrating use of additional programmable input and output functions in the trailer part for recognition of reversing, according to the method and system of the present invention.

FIG. 8 illustrates the use of further input/output functions 19 to recognize reversing operation of the vehicle train. This use is important because certain adjustments can be made only in this driving condition. In the practical example shown in FIG. 8, a reversing headlamp 78, preferably on the last trailer vehicle part of the vehicle train, is turned on. Input/output 16 is defined as an output for direct activation of power to reversing headlamp 78.

Reversing can be recognized by various means. ABS wheel-speed sensors are typically connected to wheel-signal inputs 9 of trailer ABS control electronics 8. Such sensors can be inductive sensors which scan a pole wheel with rectangular teeth and gaps therebetween. Voltages are induced in the ABS sensors and then converted to a sequence of electronic square-wave signals. Evaluation of the edges of this sequence of square-wave signals for a given wheel yields the speed of rotation of the wheel.

With such an ABS wheel-speed sensor, therefore, it is the instantaneous speed of rotation of the wheel and not its direction of rotation that can be determined. For recognition of direction of rotation, a further ABS speed sensor can be provided on the same pole wheel to draw conclusions on the direction of rotation from the time succession in which the edges of the two sequences of square-wave signals arrive. Because of its susceptibility to interference, however, this method is problematic.

In another method, a defined pattern of missing teeth is created in the pole wheel of the ABS speed sensor by omitting some teeth, and the direction of rotation is identified on the basis of the different timing of the electronic signal sequences of the missing-teeth pattern during forward and reversing movement. An appropriate distance [such as one revolution of the wheel] must be traveled in order to register the missing-teeth pattern, and so recognition of the direction of rotation is delayed. Consequently, this method also suffers from considerable disadvantages.

For recognition of the direction of rotation, it is advantageous to use a separate direction-of-rotation sensor 75, which is read into trailer ABS control electronics 8 via input/output 17, programmed as a digital input. Such a direction-of-rotation sensor [an example of which is the "PN SX105501" type sensor of Cherry Electrical Products] is designed, for example, as an active Hall-effect sensor and, on the basis of the movement of an individual tooth of the pole wheel, can quickly identify the direction of rotation of the wheel.

Figure 9:
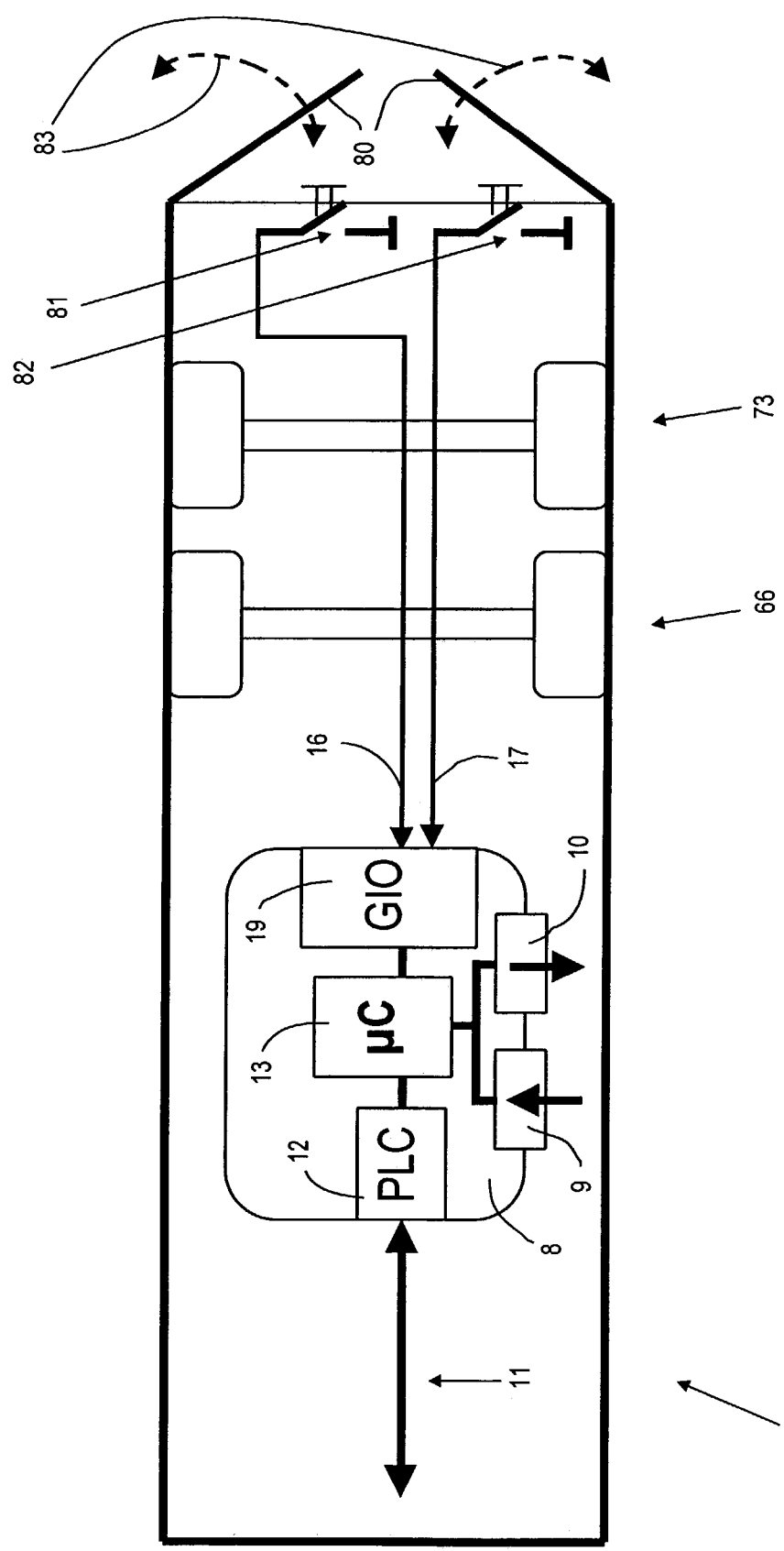
FIG. 9 is an overhead schematic diagram of a semitrailer having a double-axle illustrating use of additional programmable input and output functions in the trailer part for recognition of door-closing status, according to the method and system of the present invention.

As shown in FIG. 9, which is an overhead view of a semitrailer part 2, 4, 6 having axles 66 and 73 [double axle], inputs/outputs 16, 17 are defined as inputs for reading in the door-closing condition, and they are electrically connected to a first momentary-contact switch 81 and a second momentary-contact switch 82. Momentary-contact switches 81, 82 are actuated by cargo-space doors 80 that can be swung open and closed 83 and whose contacts are connected to the electrical frame of the vehicle when cargo-space doors 80 are closed.

Door status is transmitted from vehicle trailer parts 2, 4, 6 to display module 28 in the vehicle operator's cab, so that the vehicle operator can drive away as soon as a loading or unloading operation, for example, has been completed, without having to personally observe the cargo-space doors 80 to confirm that they have been properly closed.

Figure 10:
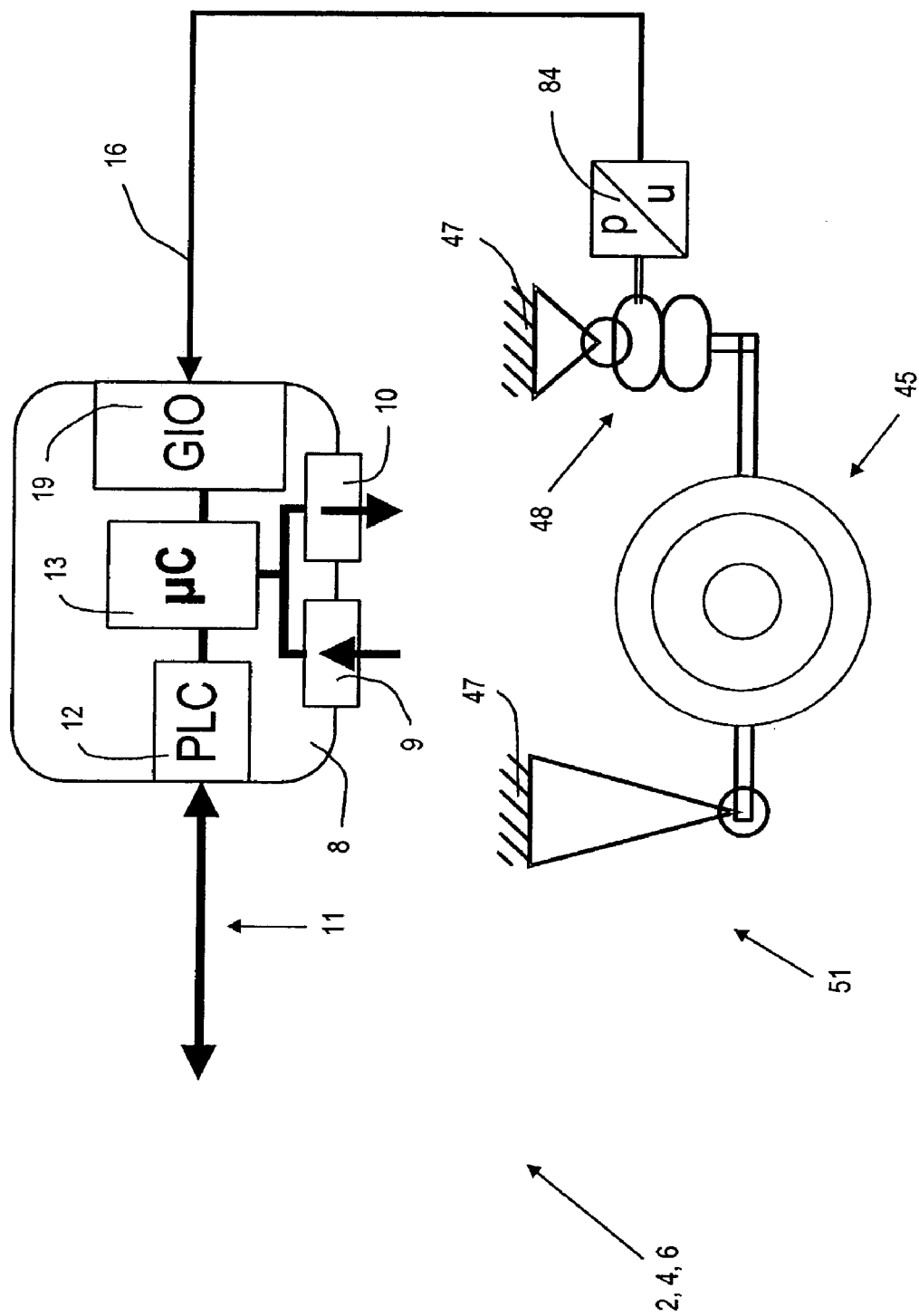
FIG. 10 is a schematic diagram illustrating use of additional programmable input and output functions in a trailer part for determination of axle load, according to the method and system of the present invention.

The functionality of axle-load determination is shown in FIG. 10 for the example of the vehicle axle of first pneumatically suspended wheel 45 in accordance with the arrangement depicted in FIG. 4. A pressure sensor 84 is connected to pneumatic suspension bellows 48, which converts the pressure in the pneumatic suspension bellows to a voltage proportional to axle load and transfers it to input 16, which is defined as an analog input with the voltage range appropriate for pressure sensor 84. In microcomputer 13, this analog voltage value is converted to a physical value such as metric tons or pounds, and the converted value is transmitted to tractor 1, where this axle-load value expressed in physical units is available for inspection by the vehicle operator on display module 28.

The pneumatic suspension for the axle whose axle load is to be measured can be configured either as the conventional pneumatic suspension or as the pneumatic suspension with electronic level-height regulation. For a conventional pneumatic suspension, input 16 illustrated in FIG. 10 is still freely selectable. If a level-height regulating system according to FIG. 4 is implemented, input/output 16 is reserved for level-height regulation, and an additional input of further input/output functions 19 are provided for measurement of pressure-sensor reading 84.

Figure 11:
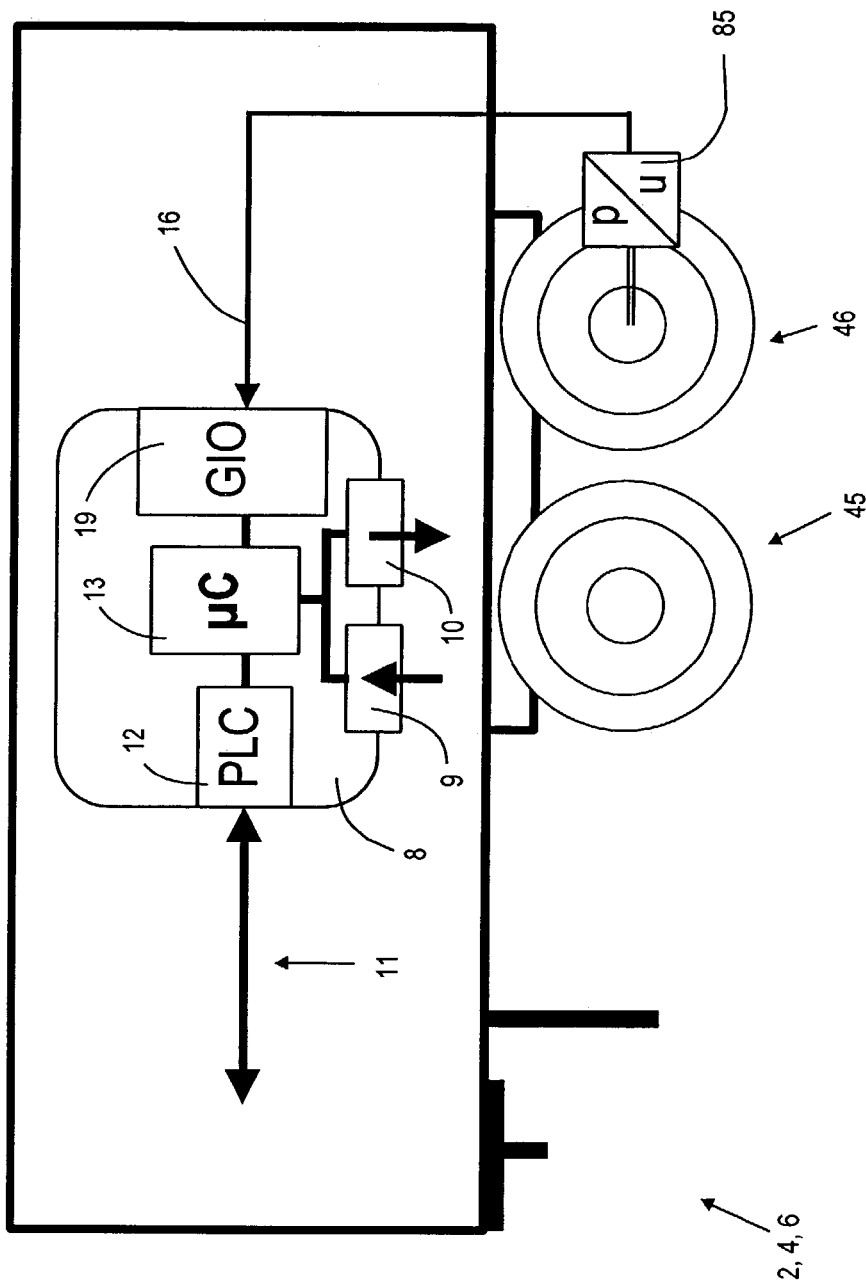
FIG. 11 is a side elevational schematic diagram of a semitrailer illustrating use of additional programmable input and output functions in the trailer part for tire-pressure monitoring, according to the method and system of the present invention.

For tire-pressure monitoring according to FIG. 11, there is also used a pressure sensor, tire-pressure sensor 85, which is connected via its pneumatic input to the tire valve of the wheel tire to be measured, in this example, to the tire valve of the tire on second wheel 46. The electrical output of sensor 85 is connected to input 16, which is programmed as an analog input. The voltage, proportional to tire pressure, delivered by pressure sensor 85 can also be converted to a physical variable in microcomputer 13 so that the vehicle operator receives a tire-pressure reading in "bar" or "psi" on display module 28.

For tire-pressure monitoring in a trailer vehicle train part, it is desirable to monitor the tire pressure of at least two wheels, one on each side of the vehicle. Failure of a non-monitored tire can then be recognized by increased tire pressure in the tire closest to the problem tire.

Figure 12:
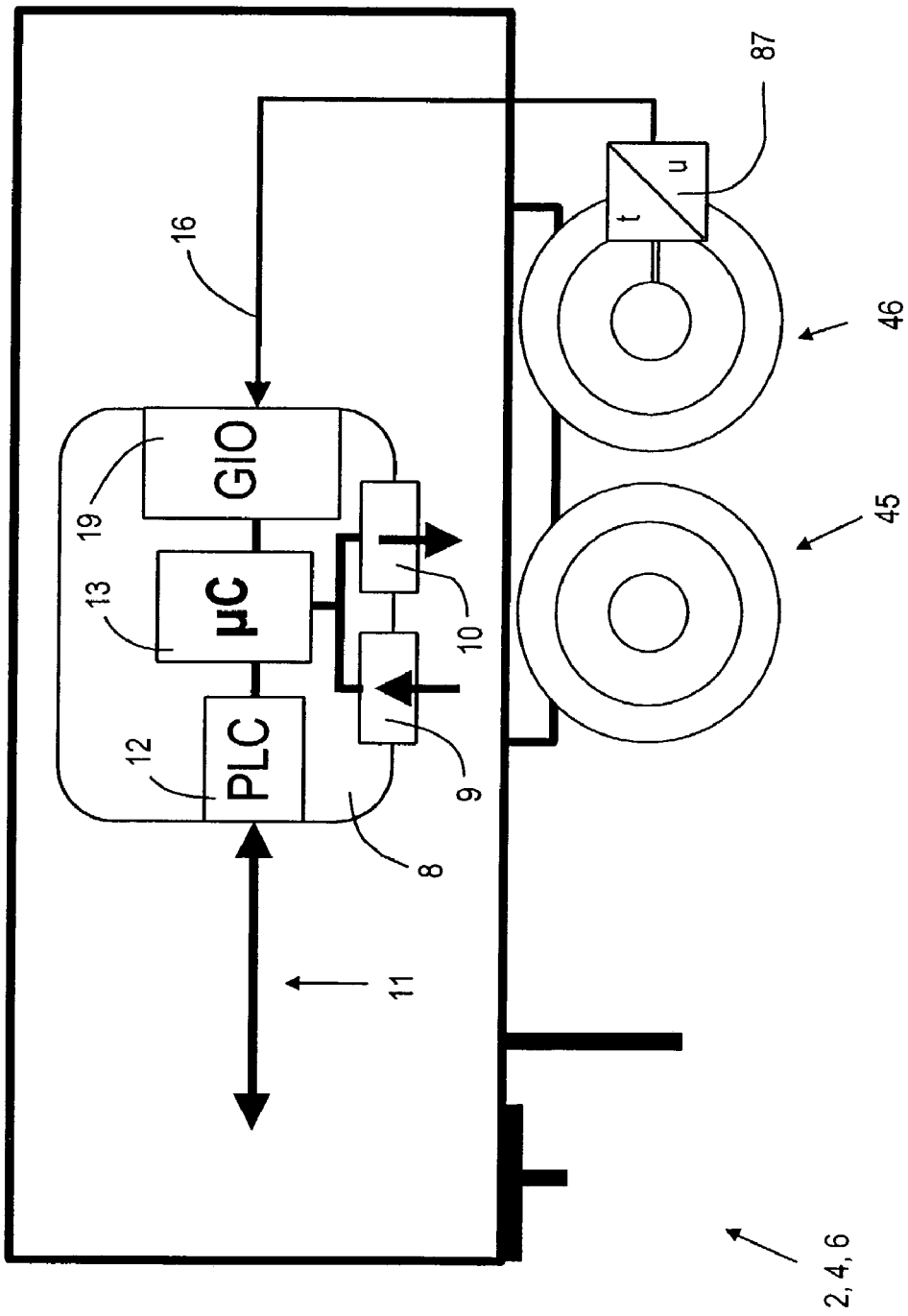
FIG. 12 is a side elevational schematic diagram of a semitrailer illustrating use of additional programmable input and output functions in the trailer part for monitoring the temperature in the wheel bearings, according to the method and system of the present invention.

For the functionality of wheel-bearing temperature monitoring according to FIG. 12, a wheel-bearing temperature sensor 87, whose electrical output is connected to input 16, programmed as an analog input, is attached to the wheel bearing to be monitored [for practical purposes, it is desirable to monitor the wheel bearings of two opposite wheels of one axle, as discussed herein in connection with FIG. 11]. In this way, the actual wheel-bearing temperature is read into microcomputer 13 and converted to a physical value [such as ° C. or ° F.].

The temperature of a wheel bearing is determined largely by the temperature of the brake [designed as a drum or disk brake], and so a rise in wheel-bearing temperature indicates the beginning of brake overload. A particularly critical consequence of undesirably high wheel-bearing temperature is that the lubricating grease can run out causing considerable damage to the axle function [at temperatures above 100° C., for example, depending on the type of grease used].

Since a vehicle operator cannot reasonably be expected to react to the display of wheel-bearing temperature as a physical variable [in ° C. or ° F.], it is desirable to present the vehicle operator with a brake-function warning for a given wheel in clear text on display module 28 if undesirable heating of the wheel bearing occurs. For this application, for example, the fact that the content of the messages from trailer ABS control electronics 8 to tractor ABS control electronics 7 can be configured as desired by programming microcomputer 13 is particularly advantageous.

Figure 13:
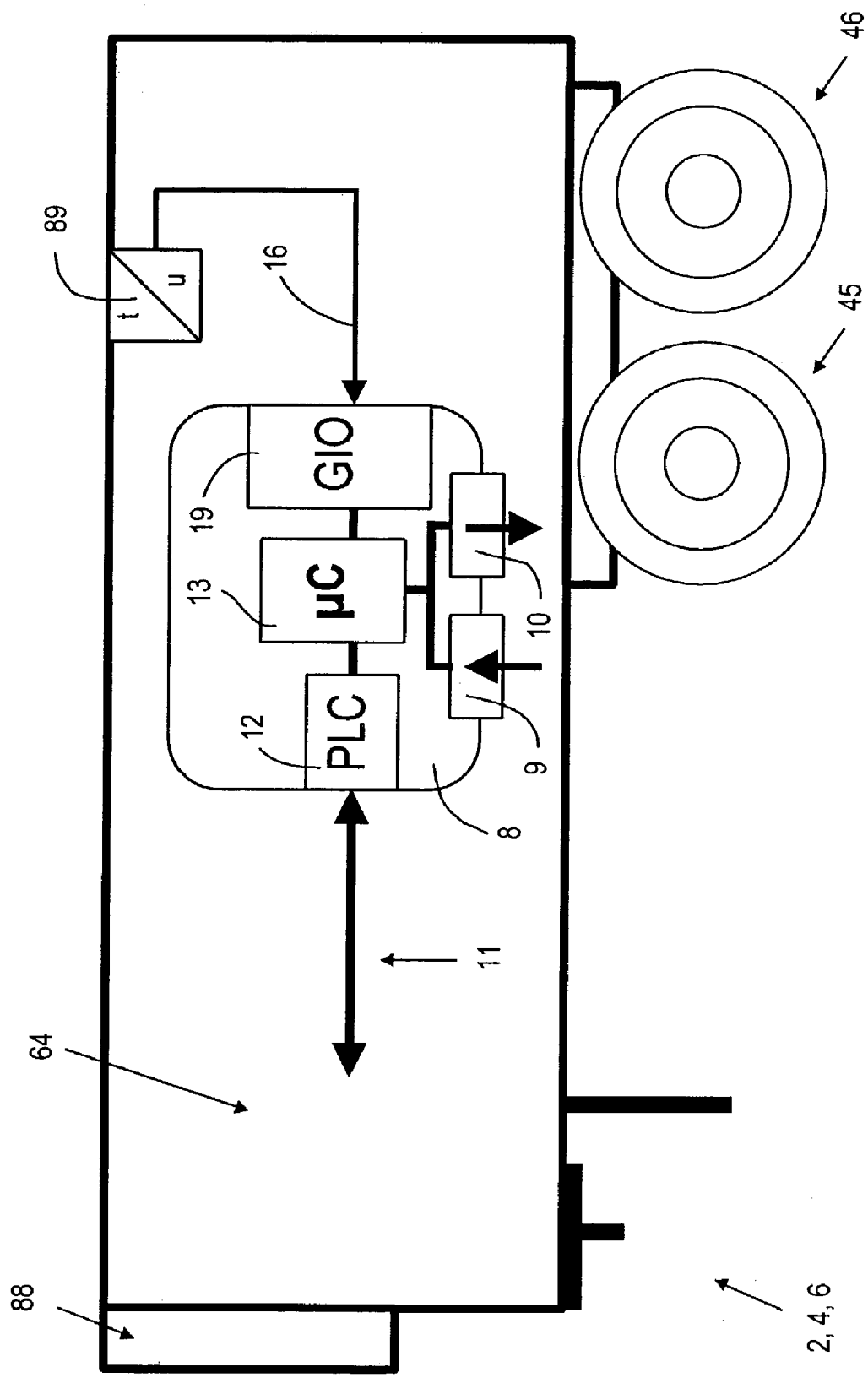
FIG. 13 is a side elevational schematic diagram of a semitrailer illustrating use of additional programmable input and output functions in the trailer part for monitoring the temperature of a refrigeration unit, according to the method and system of the present invention.

For the functionality of cargo monitoring according to the practical example depicted in FIG. 13, the cargo is monitored via a cargo-temperature sensor 89 in a semitrailer part designed as a refrigerated vehicle and thus equipped with a refrigeration unit 88. The voltage, proportional to temperature, output by temperature sensor 89 is read in at input 16, which is defined as an analog input, and is then converted by microcomputer 13 to an actual cargo temperature in physical units [° C. or ° F.], transmitted to tractor 1 and indicated therein to the vehicle operator on display module 28.

As shown in FIG. 13, cargo-temperature sensor 89 can be disposed in interior space 64 [in the roof region, for example] or, if, for example, the cargo is very temperature-sensitive, it can be placed in direct contact with the cargo and connected to input 16 via flexible electrical connection means. For the specific case of very sensitive cargo, it may be practical, in addition to the reading on the vehicle operator's display module 28, to monitor the entire cooling chain, which can be accomplished by microcomputer 13. In this way, a complete record of uninterrupted cooling of the cargo can be created, which may be provided to a customers' quality acceptance department.

As an example of how messages are configured in a network with direct communication according to FIG. 2, FIG. 14 shows sample messages for the application according to FIG. 4, in which the additional programmable input and output functions are used for implementation of pneumatic-suspension level-regulation control. As discussed above, these messages are based on the PLC data protocol according to SAE J 1587.

According to SAE J 1587[pages 102–103], a message is made up of a sequence of bytes, in which the first byte comprises the message identifier "MID" and the second byte the parameter identifier "PID." These are followed by the data bytes "Data," in which the first data byte indicates the number of data bytes to follow, while at the end of the message, the checksum "CS" is appended as the last byte.

As discussed in connection with the arrangement depicted in FIG. 2, trailer ABS control electronics 8 according to FIG. 4 makes the programmed practical functionality available, by "broadcast function," to the other vehicle electronics having PLC interfaces. This is illustrated by message 1.1 shown in FIG. 14.

Corresponding to the installation of pneumatic-suspension level-regulation control in trailer ABS control electronics 8 in first trailer vehicle train part 2 as discussed above, the "MID" for message 1.1 comprises, according to SAE J 1587, Table 1—Message ID Assignment List—one byte with decimal value 137 [Brakes, Trailer #1] and, according to page 110 of SAE J 1587, the reserved decimal value 204 is used for the "PID" of message 1.1 [identified with PID_GIO_REP, where REP [Reply] indicates the type of the automatic reply; corresponding definition by the United States standardization body is currently pending].

In the next data byte, the number n=2 is entered, meaning that two further data bytes follow, namely the function identifier "FIDa" and the parameter value "VALa."

Both data bytes can be freely selected by the control-system manufacturer. In the present case, the "FIDa" is described by a byte of decimal value 41, and means that the functionality of a pneumatic suspension is generally available in trailer ABS control electronics 8. The parameter value "VALa" is provided for further description of the pneumatic-suspension functionality. It is indicated as a binary bit pattern, in which it is defined that, for bit 3 set to logical 1, raising or lowering of the pneumatic suspension is available.

The further function identifier FIDb with the parameter value VALb indicated in square brackets means, according to message 2.1 of FIG. 15, discussed in greater detail hereinafter, that a plurality of practical functionality can also be integrated in trailer ABS control electronics 8.

Message 1.1 according to FIG. 14, which is made available to the other vehicle part electronics with PLC interface, states in clear text that, in first trailer vehicle part 2, trailer ABS control electronics 8 is provided which, using further programmable input/output functions 19, has the further practical functionality of a pneumatic suspension in which program-controlled raising and lowering is possible.

For clarity, in the description of the messages for control of the pneumatic-suspension level-regulating system according to FIG. 4, a level-regulating system satisfying only the basic functions is assumed. Thus, the basic cooperation is described. However, it should be understood that further functions known from standard level-regulating systems can be added to the basic functions, and the explanation of the basic functions simultaneously describes the implementation of complex functions in level-regulating systems.

For the description of the underlying basic functions, it is assumed that a normal level of the vehicle is defined for level-height regulation in trailer ABS control electronics 8 according to the arrangement depicted in FIG. 4. During driving, the normal level is by default the set level, and is automatically maintained by pressure variation in pneumatic suspension bellows 48, 49.

In contrast, when the vehicle is stopped, the set level can be changed, starting from the normal level. This is accomplished by control module 29 in the display/control unit with PLC interface 14 according to FIG. 2. By actuating control module 29 operating elements during the stopped vehicle condition, the vehicle operator is able to raise or lower the set level such that it differs from the normal level, in order, for example, to adapt the vehicle level to the height of a loading platform.

During such a change of set level, the level-regulating system remains active and raising or lowering of the set level with the control module 29 operating elements takes place timewise in ramp form, and so the length of time for which the control element is actuated determines the extent by which the set level is lowered or raised relative to the normal level.

Messages 1.2 to 1.4 according to FIG. 14 bring about such set-level changes while the vehicle is stopped in response to actuation of control module 29 operating elements by the vehicle operator. Message 1.2 is provided for raising, message 1.3 for lowering and message 1.4 for stopping a raise/lower change.

These messages have identical structure. Besides the "MID" and "PID," they each contain four data bytes and the checksum "CS." Corresponding to SAE J 1587, Table 1—Message ID Assignment List, decimal value 171 [Driver Information Center] is used for the "MID" of messages 1.1 to 1.4, and the "PID" of these messages is occupied by decimal value 203, which is reserved according to SAE J 1587, page 110, [and is identified with PID_GIO_REQ, where REQ [Request] indicates the type of request to the receiving means; corresponding definition by the United States standardization body is currently pending].

The number n=3 is entered in the first data byte, thus indicating that three further data bytes will follow. In the first of these subsequent three data bytes, the receiving means [Destination] is indicated. This is decimal 137, corresponding to the "MID" of message 1.1, by means of whose "broadcast function" further messages 1.2 to 1.4 are generated.

In the next data byte, a function identifier FIDa with digital value 41 is specified in the same manner as in message 1.1. It is followed by the parameter value "VALa," which is also defined in a form comparable to that of the parameter value "VALa" according to message 1.1. When bit 3 is set, it denotes a change of the level-height set value. If, simultaneously, bit 0 is set to logical 1 [message 1.2], this means that the set level will be raised, while if bit 0 is set to logical 0 [message 1.3], it means that the set level will be lowered. Resetting of bit 3 in "VALa" [message 1.4] signifies the end of a set-level change, or, in other words, the completion of raising or lowering of the set level.

Message 1.1 with the functionality information according to FIG. 14 is expanded in FIG. 15 to message 2.1 for the application case that axle-load determination according to the arrangement depicted in FIG. 10 is provided for first trailer vehicle train part 2 in addition to the pneumatic-suspension level-regulation control according to FIG. 4.

Five data bytes follow the "PID" [PID_GIO_REP], the last data bytes being the function identifier "FIDb" and the parameter "VALb," which relate to the functionality of axle-load determination. In this case, decimal number 54 is defined by the control-system manufacturer for the case of individual axle load, namely, for the case that the load of an individual axle is determined. In the present example, the parameter value "VALb" is 160, which means that the actual axle load is 16,000 pounds [this axle load is displayed to the vehicle operator on display module 28].

For the parameter value "VALb," decimal numbers between 0 and 250 indicate a currently available axle load. If the axle load is not available, for example because of an error, decimal number 255 will be transmitted to alert the vehicle operator that axle load is unavailable.

In describing messages in a network with indirect communication, sample messages 1.1 to 1.4 according to FIG. 14, which are defined for a network with direct communication, will be converted hereinafter to sample messages 3.1 to 3.4 according to FIG. 16 for a network with indirect communication according to the arrangement depicted in FIG. 3. Converted message 3.1 corresponds to "direct" message 1.1, and converted messages 3.2 to 3.4 correspond to "direct" messages 1.2 to 1.4.

As discussed above, in the generalized case, data are transmitted bidirectionally from one device to one or more other devices via the gateway function according to SAE J 1587-J 2497. An example for such a network topology is presented in FIG. 1 of SAE J 1587-J 2497.

Corresponding to SAE J 1587-J 2497 [Section 5 "The Gateway Marker"—page 5,], there is introduced a gateway marker parameter which indicates that the message will be transmitted to another network, specifically via devices having a simple gateway function. The structure of the gateway marker parameter is described in SAE J 1587-J 2497 [Section 5.1 "Gateway Marker Parameter Format"] as a gateway marker PID comprising three bytes, the first being the gateway marker parameter identifier $PID_{GM}$, the second a data byte $data_{GM1}$ with the content of the originating or destination gateway, and the third a data byte with the content of 0. Furthermore, SAE J 1587-J 2497 [Section 5.2 "Message Format"] describes the structure of a message, in which the gateway marker PID is included, and by means of which a message is transmitted from one network to another.

On this basis, sample messages 1.1 to 1.4 of the direct communication via PLC according to FIG. 14 are reconfigured as sample messages 3.1 to 3.4 for indirect communication via gateways according to FIG. 16. Compared with direct communication via PLC according to FIG. 14, the gateway marker PIDs, which comprise three bytes each and which respectively replace the PIDs of direct communication, are contained in messages 3.1 to 3.4 of the indirect communication via gateways according to FIG. 16. In messages 3.1 to 3.4 according to FIG. 16, the remaining parts that follow the gateway marker PID are identical to the parts following the PIDs of "direct" messages 1.1 to 1.4 of FIG. 14.

Within the gateway marker PID, the reserved decimal value 205 in conformity with SAE J 1587 [page 110] is provided as the gateway marker parameter identifier $PID_{GM}$ [corresponding definition by the United States standardization body is currently pending].

In message 3.1, the second data byte $data_{GM1}$ is occupied by the "$MID_{GW\_DST}$" of the destination gateway, namely, with a byte of decimal value 136 [Brakes, Power Unit], in conformity with SAE J 1587, Table 1—Message ID Assignment List, addressing tractor ABS control electronics 7, in which there is installed gateway 33, 27 to display/control unit 26, which is informed, via the "broadcast function," primarily about the further practical functionality of the pneumatic suspension.

In messages 3.2 to 3.4, the second data byte data$_{GM1}$ is occupied by the "MID$_{GW\_DST}$" of the destination gateway, the gateway for the separate level-regulation control according to the arrangement depicted in FIG. 3, connected via the further connection means to first trailer vehicle train part 2. Since, as discussed, level-regulation control 34 is connected to trailer ABS control electronics 8 of first trailer vehicle part 2 via the connection means 33, 27, decimal value 137 [Brakes, Trailer #1] is entered again.

Thus, parameterization of the gateway marker PID in conformity with SAE J 1587-J 2497, enables control of the various communication channels for transmission of messages via the gateways.

In messages 3.1 to 3.4, the "MID" is designated more accurately with "MID$_{org}$" which signifies the MID of the "originating device." In message 3.1, "MID$_{org}$" has decimal value 151 [Suspension, Trailer #1] in conformity with SAE J 1587, Table 1—Message ID Assignment List. In this way, it is defined that pneumatic-suspension level-regulation control 34, connected via the gateway, belongs to the class of suspensions for first trailer vehicle train part 2.

In messages 3.2 to 3.4, as in messages 1.2 to 1.4 according to FIG. 14, "MID$_{org}$" has decimal value 171 [Driver Information Center].

Accordingly, the present invention provides an improved method for controlling the exchange of data between the tractor and trailer(s) in a vehicle train having vehicle electronics interconnected via a PLC data bus to control various vehicle operating functions by providing data representing a programmed input and/or output function of the vehicle electronics of the trailer vehicle train part automatically and cyclically via the PLC data bus to other vehicle electronics having PLC interfaces.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling operating functions in a vehicle train including a tractor and at least one trailer coupled to said tractor, vehicle train electronic control units including a tractor electronic control unit in said tractor and a trailer electronic control unit in at least one trailer in which at least one of electronic measuring and operating functions are implemented, said tractor and trailer electronic control units each including a powerline carrier interface, said trailer electronic control unit being constructed and arranged to implement an operating function of said vehicle train specific to said trailer electronic control unit, said trailer electronic control unit further including at least one of an input function and an output function programmed therein for implementing an operating function of said vehicle train other than said operating function specific to said trailer electronic control unit, a powerline carrier data bus formed by the electrical interconnection of said powerline carrier interfaces of said tractor and trailer electronic control units to enable the transmission and reception of data between said electronic control units, and a power supply in said tractor electrically connected to said powerline carrier data bus, the method comprising the steps of broadcasting data representing said at least one of a programmed input function and output function by said trailer electronic control unit automatically and cyclically via said powerline carrier data bus to other of said vehicle train electronic control units having powerline carrier interfaces, and implementing based on said broadcast data said operating function of said vehicle train other than said operating function specific to said trailer electronic control unit.

2. The method according to claim 1, wherein said trailer electronic control unit is arranged and constructed as an anti-lock braking system electronic control unit having inputs and outputs associated with anti-lock braking system operating functions, and said at least one of a programmed input function and an output function of said trailer electronic control unit being associated with an operating function of said vehicle train other than for anti-lock braking regulation.

3. The method according to claim 1, further comprising the steps of receiving said data representing at least one of an input function and output function in said tractor electronic control unit, evaluating said data, recognizing the programmed functionality of said at least one of an input function and output function, and executing control of said programmed functionality.

4. The method according to claim 1, wherein said step of providing data representing said at least one of an input function and an output function automatically and cyclically on said powerline carrier data bus is effected by a vehicle train electronic control unit that does not have a powerline carrier interface, said vehicle train electronic control unit that does not have a powerline carrier interface including said at least one of a programmed input function and an output function and being interconnected via data communication means with vehicle train electronic control units including powerline carrier interfaces.

5. The method according to claim 4, wherein said data communication means includes a powerline carrier network gateway.

6. The method according to claim 5, wherein said powerline carrier network gateway is designed by a software protocol by which communications are implemented using messages.

7. The method according to claim 1, wherein said tractor further includes control electronics for an anti-lock braking system.

8. The method according to claim 7, wherein said control electronics for an anti-lock braking system provided in said tractor is connected via data communication means to a display/control module for communication with an operator of said vehicle train.

9. The method according to claim 8, wherein said data communication means includes gateway communication means.

10. The method according to claim 1, wherein said step of implementing said operating function of said vehicle train other than said operating function specific to said trailer electronic control unit includes implementing a steering-axle control function.

11. The method according to claim 1, wherein said step of implementing said operating function of said vehicle train other than said operating function specific to said trailer electronic control unit includes controlling vehicle lighting.

12. The method according to claim 1, wherein said step of implementing said operating function of said vehicle train other than said operating function specific to said trailer electronic control unit includes at least one of monitoring and controlling vehicle train door functions.

13. The method according to claim 1, further comprising the step of determining axle load in said at least one trailer based on said at least one of a programmed input function and an output function.

14. The method according to claim 1, further comprising the step of determining air pressure in vehicle tires of said at least one trailer based on said at least one of a programmed input function and an output function.

15. The method according to claim 1, further comprising the step of measuring temperature in wheel bearings of said at least one trailer based on said at least one of a programmed input function and an output function.

16. The method according to claim 1, wherein said step of implementing said operating function of said vehicle train other than said operating function specific to said trailer electronic control unit includes at least one of monitoring and controlling the temperature of cargo containment areas in said at least one trailer.

17. A method for controlling operating functions in a vehicle train including a tractor vehicle train part, at least one trailer vehicle train part coupled to said tractor vehicle train part, vehicle train part electronics provided in said tractor vehicle train part and in at least one trailer vehicle train part in which at least one of electronic measuring and control functions are implemented, said vehicle train part electronics including powerline carrier interfaces, said vehicle train part electronics of said at least one trailer vehicle train part including at least one of an input function and an output function associated with operating functions of said vehicle train programmed therein, a powerline carrier data bus formed by the electrical interconnection of said powerline carrier interfaces to enable the transmission and reception of data between said vehicle train part electronics, and a power supply in said tractor vehicle train part electrically connected to said powerline carrier data bus, the method comprising the steps of providing data representing at least one of said programmed input function and output function automatically and cyclically via said powerline carrier data bus to other of said vehicle train part electronics having powerline carrier interfaces, implementing a lift-axle control function based on said data representing at least one of said programmed input function and output-function.

18. A method for controlling operating functions in a vehicle having a tractor and at least one trailer connected to said tractor, the tractor and trailer combination including a power bus which supplies electrical power to said tractor and said at least one trailer, said at least one trailer including an electronic control unit constructed and arranged to implement an operating function of said vehicle specific to said trailer electronic control unit, said trailer electronic control unit further having at least one of a programmed input function and an output function for implementing an operating function of a system of said vehicle other than said operating function specific to said trailer electronic control unit, the method comprising the steps of automatically producing a data signal representing said at least one of a programmed input function and an output function, broadcasting said signal via said power bus, and implementing based on said broadcast data signal said operating function of a system of said vehicle other than said operating function specific to said trailer electronic control unit.

19. The method according to claim 18, wherein said data signal is repetitively provided on said power bus at fixed intervals.

20. The method according to claim 18, wherein said step of implementing said operating function of a system of said vehicle other than said operating function specific to said trailer electronic control unit includes controlling vehicle lighting.

21. The method according to claim 18, wherein said step of implementing operating function of a system of said vehicle other than said operating function specific to said trailer electronic control unit includes at least one of monitoring and controlling vehicle doors.

22. The method according to claim 18, further comprising the step of determining axle load in said at least one trailer based on said data signal representing said at least one of a programmed input function and an output function.

23. The method according to claim 18, further comprising the step of determining air pressure in vehicle tires of said at least one trailer based on said data signal representing said at least one of a programmed input function and an output function.

24. The method according to claim 18, further comprising the step of measuring temperature in wheel bearings of said at least one trailer based on said data signal representing said at least one of a programmed input function and an output function.

25. The method according to claim 18, wherein said step of implementing said operating function of a system of said vehicle other than said operating function specific to said trailer electronic control unit includes at least one of monitoring and controlling the temperature of cargo containment areas in said at least one trailer.

26. A method for controlling operating functions in a vehicle having a tractor and at least one trailer connected to said tractor, the tractor and trailer combination including a power bus for supplying electrical power to said tractor and said at least one trailer, said at least one trailer including an electronic control unit having at least one of a programmed input function and output function associated with an operating function of said vehicle, the method comprising the steps of automatically producing a data signal representing said at least one of a programmed input function and output function, applying said signal cyclically on said power bus, and implementing a lift-axle control function based on said data signal representing said at least one of a programmed input function and output function.

27. A method for controlling operating functions in a vehicle having a tractor and at least one trailer connected to said tractor, the tractor and trailer combination including a power bus for supplying electrical power to said tractor and said at least one trailer, said at least one trailer including an electronic control unit having at least one of a programmed input function and output function associated with an operating function of said vehicle, the method comprising the steps of automatically producing a data signal representing said at least one of a programmed input function and output function, applying said signal cyclically on said power bus, and implementing a steering-axle control function based on said data signal representing said at least one of a programmed input function and output function.

28. A data communications system for a vehicle having a tractor and at least one trailer connected to said tractor, the tractor and trailer combination including a power bus which supplies electrical power to said tractor and said at least one trailer, said at least one trailer including an electronic control unit constructed and arranged to implement an operating function of said vehicle specific to said trailer electronic control unit, the system comprising means for providing in said trailer electronic control unit at least one of a programmed input function and an output function for implementing an operating function of said vehicle other than said operating function specific to said trailer electronic control unit, means for automatically producing a data signal representing said at least one of a programmed input function and an output function, means for broadcasting said signal automatically via said power bus, and means for implementing said operating function of said vehicle other than said operating function specific to said trailer electronic control unit based at least in part on said at least one of a programmed input function and an output function.

29. The system according to claim 28, wherein said data signal is repetitively provided on said power bus at fixed intervals.

30. The system according to claim 28, further comprising a vehicle anti-lock braking system and means associated with said electronic control unit for controlling said anti-lock braking system.

31. The system according to claim 30, further comprising display means connected to said means for controlling said anti-lock braking system for communication with an operator of said vehicle.

32. The system according to claim 28, further comprising means disposed in said tractor for receiving said data signal, means for evaluating said data signal, means for recognizing said operating function of said at least one of a programmed input function and an output function represented by said data signal, and means for executing control of said operating function in said at least one trailer.

33. The system according to claim 28, further comprising gateway communication means for communicating said data signal among said power bus, said tractor and said at least one trailer.

34. The system according to claim 33, wherein said gateway communication means effects communications using messages.

35. The system according to claim 28, further comprising vehicle lighting and wherein said at operating function of said vehicle other than said operating function specific to said trailer electronic control unit is regulation of said vehicle lighting.

36. The system according to claim 28, further comprising at least one vehicle door supported on said at least one trailer and wherein said operating function of said vehicle other than said operating function specific to said trailer electronic control unit is regulation of said at least one vehicle door.

37. The system according to claim 28, further comprising at least one vehicle axle for said at least one trailer and means for determining axle load based on said at least one of a programmed input function and an output function.

38. The system according to claim 28, further comprising at least one vehicle tire of said at least one trailer and means for determining air pressure in said at least one vehicle tire based on said at least one of a programmed input function and an output function.

39. The system according to claim 28, further comprising vehicle wheel-bearings of said at least one trailer and means for measuring temperature in said wheel bearings based on said at least one of a programmed input function and an output function.

40. A data communications system for a vehicle having a tractor and at least one trailer coupled to said tractor, the tractor and trailer combination including a power bus for supplying electrical power to said tractor and said at least one trailer, the system comprising means for providing at least one of a programmed input function and output function associated with an operating function of said vehicle, means for automatically producing a data signal representing at least one of said programmed input function and output function, means for applying said data signal cyclically on said power bus, at least one vehicle lift-axle and means for implementing a lift-axle control function based on said at least one programmed input function and output function.

41. A data communications system for a vehicle having a tractor and at least one trailer coupled to said tractor, the tractor and trailer combination including a power bus for supplying electrical power to said tractor and said at least one trailer, the system comprising means for providing at least one of a programmed input function and output function associated with an operating function of said vehicle, means for automatically producing a data signal representing at least one of said programmed input function and output function, means for applying said data signal cyclically on said power bus, at least one steering-axle and means for implementing a steering-axle control function based on said at least one programmed input function and output function.

42. The system according to claim 28, further comprising means for monitoring the temperature of cargo containment areas in said at least one trailer and wherein said operating function of said vehicle other than said operating function specific to said trailer electronic control unit is temperature regulation of said cargo containment areas.

43. A method for exchanging data in a vehicle train including a tractor and at least one trailer coupled to said tractor, vehicle train electronic control units including a tractor electronic control unit in said tractor and a trailer electronic control unit in at least one trailer in which at least one of electronic measuring and operating functions are implemented, said tractor and trailer electronic control units each including a powerline carrier interface, said trailer electronic control unit being constructed and arranged to implement an operating function of said vehicle train specific to said trailer electronic control unit, said trailer electronic control unit further including at least one of an input function and an output function programmed therein for implementing an operating function of said vehicle train other than said operating function specific to said trailer electronic control unit, a powerline carrier data bus formed by the electrical interconnection of said powerline carrier interfaces of said tractor and trailer electronic control units to enable the transmission and reception of data between said electronic control units, and a power supply in said tractor electrically connected to said powerline carrier data bus, the method comprising the steps of broadcasting data representing said at least one of a programmed input function and output function automatically and cyclically via said powerline carrier data bus to other of said vehicle train electronic control units having powerline carrier interfaces, recognizing in said tractor electronic control unit said operating function other than said operating function specific to said trailer electronic control unit based on said broadcast data, and implementing said operating function other than said operating function specific to said trailer electronic control unit based on said broadcast data.

44. A data communications system for a vehicle train having a tractor and at least one trailer coupled to said tractor, the system comprising vehicle train electronic control units including a tractor electronic control unit in said tractor and trailer electronic control unit in at least one trailer in which at least one of electronic measuring and operating functions are implemented, said tractor and trailer electronic control units each including a powerline carrier interface, said trailer electronic control unit being constructed and arranged to implement an operating function of said vehicle train specific to said trailer electronic control unit, said trailer electronic control unit further including at least one of an input function and an output function programmed therein for implementing an operating function of said vehicle train other than said operating function specific to said trailer electronic control unit, a powerline carrier data bus formed by the electrical interconnection of said powerline carrier interfaces of said tractor and trailer electronic control units to enable the transmission and reception of data between said electronic control units, a power supply in said tractor electrically connected to said powerline carrier data bus, means for broadcasting data representing said at least one of an input function and an output function automatically and cyclically via said powerline carrier data bus to other of said vehicle train electronic control units having powerline carrier interfaces, means associated with said tractor electronic control unit for recognizing said operating function of said vehicle train other than said operating function specific to said trailer electronic control unit based on said broadcast data, and means for implementing said operating function of said vehicle train other than said operating function specific to said trailer electronic control unit based on said broadcast data.

45. A method for exchanging data in a vehicle train including a tractor and at least one trailer coupled to said tractor, vehicle train electronic control units including a tractor electronic control unit in said tractor and a trailer electronic control unit in said at least one trailer, said tractor and trailer electronic control units each including a powerline carrier interface, said trailer electronic control unit being constructed and arranged to implement an operating function of said at least one trailer specific to said trailer electronic control unit, said trailer electronic control unit further including at least one input/output function programmed therein for implementing additional operating functionality of said at least one trailer other than said operating function specific to said trailer electronic control unit, and a powerline carrier data bus formed by the electrical interconnection of said powerline carrier interfaces of said vehicle train electronic control units to enable the transmission and reception of data between said vehicle train electronic control units, the method comprising the steps of broadcasting data representing said at least one programmed input/output function automatically and cyclically over said powerline carrier data bus by said trailer electronic control unit to other of said vehicle train electronic control units having powerline carrier interfaces, recognizing in said tractor electronic control unit said additional operating functionality, and communicating said additional operating functionality to an operator of said vehicle train in said tractor.

46. A data communications system for a vehicle train having a tractor and at least one trailer coupled to said tractor, the system comprising vehicle train electronic control units including a tractor electronic control unit in said tractor and a trailer electronic control unit in said at least one trailer, said tractor and trailer electronic control units each including a powerline carrier interface, said trailer electronic control unit being constructed and arranged to implement an operating function of said at least one trailer specific to said trailer electronic control unit, said trailer electronic control unit further including at least one input/output function programmed therein for implementing additional operating functionality of said at least one trailer other than said operating function specific to said trailer electronic control unit, a powerline carrier data bus formed by the electrical interconnection of said powerline carrier interfaces of said vehicle train electronic control units to enable the transmission and reception of data between said vehicle train electronic control units, means for broadcasting data representing said at least one programmed input/output function automatically and cyclically over said powerline carrier data bus by said trailer electronic control unit to other of said vehicle train electronic control units having powerline carrier interfaces, means for recognizing in said tractor electronic control unit said additional operating functionality, and means for communicating said additional operating functionality to an operator of said vehicle train in said tractor.

* * * * *